(12) United States Patent
Decker et al.

(10) Patent No.: US 12,486,868 B2
(45) Date of Patent: Dec. 2, 2025

(54) WEAR RESISTANT BEARING SYSTEM

(71) Applicant: Roller Bearing Company of America, Inc., Oxford, CT (US)

(72) Inventors: Michael Decker, Torrance, CA (US); Frank Adams, Irvine, CA (US); Carl Hartman, Irvine, CA (US); Jack Kuzminsky, Mission Viejo, CA (US); Ryan Meeks, Huntington Beach, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 303 days.

(21) Appl. No.: 18/201,349

(22) Filed: May 24, 2023

(65) Prior Publication Data
US 2023/0383789 A1    Nov. 30, 2023

Related U.S. Application Data

(60) Provisional application No. 63/345,346, filed on May 24, 2022.

(51) Int. Cl.
*F16C 33/12* (2006.01)
*F16C 11/06* (2006.01)
(Continued)

(52) U.S. Cl.
CPC ........ *F16C 33/121* (2013.01); *F16C 11/0614* (2013.01); *F16C 23/045* (2013.01);
(Continued)

(58) Field of Classification Search
CPC .. F16C 11/0614; F16C 23/043; F16C 23/045; F16C 23/046; F16C 33/121;
(Continued)

(56) References Cited

U.S. PATENT DOCUMENTS 3,517,974 A    6/1970    Eklund
3,805,567 A    4/1974    Agius-Sinerco
(Continued)

FOREIGN PATENT DOCUMENTS

EP    2186572         5/2010
EP    1801248 B1    10/2010
(Continued)

OTHER PUBLICATIONS

Ball, A. "On the Importance of Work Hardening in the Design of Wear-Resistant Materials," Department of Metallurgy and Material Science, University of Cape Town, Mar. 16, 1983, pp. 201-207.

*Primary Examiner* — Phillip A Johnson
(74) *Attorney, Agent, or Firm* — Ruggiero McAllister & McMahon LLC; Edward L McMahon

(57) ABSTRACT

A wear resistant bearing system includes an inner member that has an internal core and a bearing surface which has a 50 Rockwell C scale hardness or greater. The inner member has a chemical composition that is uniform throughout the internal core and the bearings surface. The wear resistant bearing system includes an outer member that partially surrounds the inner member and includes a receiving surface that has liner system adhered thereto. The liner system includes a wear resistant matrix that has one or more reinforcing fiber systems and has one or more lubricative fibers system dispersed in the wear resistant matrix. The liner system has a wear surface that has portions of both the reinforcing fiber system and the lubricative fiber system. The wear surface is continuous.

38 Claims, 14 Drawing Sheets

(51) Int. Cl.
  *F16C 23/04* (2006.01)
  *F16C 33/20* (2006.01)
(52) U.S. Cl.
  CPC ........ *F16C 33/201* (2013.01); *F16C 2202/04* (2013.01); *F16C 2204/42* (2013.01); *F16C 2204/52* (2013.01); *F16C 2208/02* (2013.01); *F16C 2208/04* (2013.01); *F16C 2208/32* (2013.01); *F16C 2240/54* (2013.01); *F16C 2326/43* (2013.01)
(58) Field of Classification Search
  CPC .... F16C 33/125; F16C 33/201; F16C 33/203; F16C 2202/04; F16C 2204/42; F16C 2204/52; F16C 2208/02; F16C 2208/32; F16C 2208/40; F16C 2208/42; F16C 2240/54; F16C 2326/43
  See application file for complete search history.

(56) References Cited

U.S. PATENT DOCUMENTS

| | | | |
|---|---|---|---|
| 3,900,408 A * | 8/1975 | Turner | F16C 23/045 |
| | | | 508/106 |
| 4,056,478 A | 11/1977 | Capelli | |
| 4,075,951 A | 2/1978 | Chierici et al. | |
| 4,123,122 A | 10/1978 | Gabrielson et al. | |
| 4,687,556 A | 8/1987 | Sutton et al. | |
| 5,358,360 A | 10/1994 | Mai | |
| 5,468,071 A | 11/1995 | Tourneux et al. | |
| 5,486,052 A | 1/1996 | Sibley et al. | |
| 6,365,556 B1 * | 4/2002 | Drew | C10M 149/12 |
| | | | 442/361 |
| 6,729,763 B2 | 5/2004 | Post et al. | |
| 7,122,086 B2 | 10/2006 | Tanaka et al. | |
| 7,296,965 B2 | 11/2007 | Cooper et al. | |
| 7,543,992 B2 | 6/2009 | Bruce et al. | |
| 7,648,282 B2 | 1/2010 | Shore et al. | |
| 7,942,750 B2 | 5/2011 | Hirai et al. | |
| 8,535,457 B2 | 9/2013 | Maeda | |
| 9,528,550 B2 | 12/2016 | Yamamoto | |
| 9,670,954 B2 | 6/2017 | Turmeau et al. | |
| 10,132,360 B2 | 11/2018 | Lock | |
| 10,308,890 B2 * | 6/2019 | Karaki | C08G 18/58 |
| 10,724,575 B2 | 7/2020 | Coombe et al. | |
| 2002/0139455 A1 | 10/2002 | Kuehmann et al. | |
| 2003/0095729 A1 | 5/2003 | Post et al. | |
| 2008/0040886 A1 | 2/2008 | Arnold et al. | |
| 2010/0270757 A1 | 10/2010 | Beckington | |
| 2011/0262059 A1 * | 10/2011 | Karaki | F16C 33/208 |
| | | | 384/13 |
| 2015/0252389 A1 | 9/2015 | Turmeau et al. | |
| 2016/0160920 A1 | 6/2016 | Karaki et al. | |
| 2017/0072475 A1 | 3/2017 | Haimer | |
| 2019/0126597 A1 | 5/2019 | Ziegler et al. | |
| 2020/0224636 A1 * | 7/2020 | Meeks | F03D 1/0675 |
| 2021/0180650 A1 | 6/2021 | McDade et al. | |
| 2022/0186780 A1 | 6/2022 | Dan | |

FOREIGN PATENT DOCUMENTS

| | | |
|---|---|---|
| EP | 3375530 | 9/2018 |
| EP | 3498380 | 6/2019 |
| WO | 2006019983 A2 | 2/2006 |
| WO | 2010012001 A2 | 1/2010 |
| WO | 2011039095 A1 | 4/2011 |
| WO | 2011138360 | 11/2011 |

\* cited by examiner

WEAR RESISTANT BEARING SYSTEM

CROSS REFERENCE TO RELATED APPLICATION

This application claims the benefit of prior-filed, U.S. Provisional Patent Application No. 63/345,346, filed on May 24, 2022, the entire contents of which is incorporated herein by reference in its entirety.

FIELD OF THE INVENTION

There is disclosed herein a wear resistant bearing system for use in dithering and cryogenic applications and includes methods for selecting materials for the wear resistant bearing for the dithering and cryogenic applications. There is further disclosed herein a method for hardening surfaces of the bearing by in-situ dithering of a bearing inner member relative to a bearing outer member during operation. The wear resistant bearing has utility for use in aircraft flight control surfaces, rocket engines, and various cryogenic applications.

BACKGROUND

Various bearing are typically used in aircraft flight control surface applications such as in rudders, horizontal stabilizers, elevators, flaps, and ailerons, elevons, spoilers, speed brakes, slats as well as in other aircraft applications such as thrust reversers, blocker doors, engine mounts, landing gear components (trunnions, uplock latch, gear doors), control rods, auxiliary power unit mounts, hydrogen fuel cell (intake/exhaust port valve). These bearings include an outer member that at least partially surrounds an inner member. A self-lubricating liner is typically adhered to a concave surface of the outer member and slidingly engages the inner member.

These bearings typically spend a large portion of their service life in operating conditions that result in relatively light pressure on the bearing liner. In these operating conditions the use of traditional wear resistant bearing liners can have disastrous results. Operating these bearings in the foregoing conditions can result in severe ball scoring and subsequent premature bearing failure. Prior art bearings for flight control surface applications and other aircraft applications typically employ a 440C stainless steel, hard anodized aluminum, or precipitation hardened steel with a surface hardness of 55 to 62 HRC for the inner member. To prevent scoring of the inner member, prior art bearings for flight control surface applications employ a relatively soft self-lubricating liner. However, use of the relatively soft self-lubricating liner reduces the overall service life of the bearing. In an attempt to extend the service life of the flight control surface applications, some prior art bearings employed a hard surfacing (e.g., chrome plating) on the inner member. However, hard surfacing of the inner member can be cost prohibitive and presents a risk of cracking and the generation of hard particle wear debris inside the bearing that accelerate wear.

Thus, there is a need for an improved bearing that addresses the problems described above.

SUMMARY

There is disclosed herein a wear resistant bearing system for dithering applications. The bearing system includes a metallic inner member that has a bearing surface that has an initial hardness and is work hardenable. The bearing system includes an outer member that at least partially surrounds the inner member and includes a receiving surface that has a liner system adhered thereto. The liner system includes a wear resistant matrix that has one or more reinforcing fiber systems and one or more polymeric lubricants dispersed therein. The liner system has a wear surface. The initial hardness of a thin layer at the surface of the metallic inner member is increased to a second hardness, that is greater than the initial hardness, as a result of work hardening caused by one or more of machining, tumbling, and in-situ dithering of the inner member relative to the outer member.

In some embodiments, the initial hardness is less than 50 HRC, and preferably less than HRC and more preferably between 36 HRC and 45 HRC.

In some embodiments, the second hardness is greater than 50 HRC and preferably about HRC to about 58 HRC.

In some embodiments, the inner member includes one of an austenitic stainless steel, a nickel-based super alloy, and a titanium alloy.

In some embodiments, the wear resistant matrix is exposed to the wear resistant surface and ditheringly engages the bearing surface thereby causing the work hardening of the bearing surface.

In some embodiments, the wear resistant matrix can include one or more base resins and or additives. The one or more base resins can include one or more of thermoset (such as phenolic and polyimide), acrylic, nitrile phenolic, and epoxy resins or other suitable resins and potential additives to enhance composite performance.

In some embodiments, the bearing surface includes microscopic asperities, and the wear resistant surface ditheringly engages and work hardens the microscopic asperities.

In some embodiments, the one or more polymeric lubricants remain in the wear resistant matrix.

In some embodiments, the one or more polymeric lubricants are in the form of lubricative fibers.

In some embodiments, the one or more polymeric lubricants include one or more of polytetrafluoroethylene (PTFE), ethylene tetrafluoroethylene (ETFE), and high density polyethylene (HDPE).

In some embodiments, the one or more reinforcing fiber systems include one or more of aramid, glass, polyester, polyamide, polyimide, and polyphenylene sulfide.

In some embodiments, the dithering is defined by a bearing stress between the bearing surface and the wear surface of less than 5 ksi, a cyclic frequency of greater than 1 Hz, an angle of oscillation of less than or equal to ±5 degrees, and at a temperature of about 18 degrees Celsius (65 degrees Fahrenheit) to about 24 degrees Celsius (75 degrees Fahrenheit).

There is disclosed herein a wear resistant bearing system for dithering applications. The bearing system includes a metallic inner member that has a bearing surface that is not work hardenable. The bearing system includes an outer member that at least partially surrounds the inner member and includes a receiving surface that has a liner system adhered thereto. The liner system includes a wear resistant matrix that has a basal layer which is adhered to the receiving surface and includes one or more reinforcing fiber systems. The wear resistant matrix has a wear surface layer which has a wear surface that is in sliding engagement with the bearing surface. The wear surface layer extends between the wear surface and the basal layer. The wear surface layer consists entirely of one or more polymeric lubricants.

In some embodiments, the wear resistant matrix includes a semi-crystalline or crystalline film-forming polymer.

In some embodiments, the semi-crystalline or crystalline film-forming polymer includes a polyimide or nitrile-phenolic.

In some embodiments, the wear surface is ablated using glass bead ablation.

There is disclosed herein a wear resistant bearing system for cryogenic applications. The bearing system includes a metallic inner member that has a bearing surface that has an initial hardness. The bearing system includes an outer member that at least partially surrounds the inner member and includes a receiving surface that has a liner system adhered thereto. The liner system includes a wear resistant matrix that has one or more reinforcing fiber systems and one or more polymeric lubricants dispersed therein. The liner system has a wear surface. The initial hardness of the bearing surface is increased to a second hardness that is greater than the initial hardness as a result of work hardening.

In some embodiments, the inner member includes one of an un-worked austenitic stainless steel, a nickel-based super alloy, and a titanium alloy.

In some embodiments, the inner member includes a plating on the bearing surface. In some embodiments, the plating includes chromium. In some embodiments, the plating includes AMS 2438 chromium.

In some embodiments, the bearing surface is work hardenable. In some embodiments, the bearing surface is work hardenable without substantial necking.

In some embodiments, the work hardening is caused by dithering of the inner member relative to the outer member.

In some embodiments, the dithering is defined by a frequency of greater than or equal to 0.3 Hz angles of oscillation of about 45 to about 55 degrees at temperature range of about negative 184 degrees Celsius (negative 300 degrees Fahrenheit) to about negative 59 degrees Celsius (negative 75 degrees Fahrenheit) and at a bearing stress of about 5 ksi to about 40 ksi between the bearing surface and the liner system.

There is disclosed herein a wear resistant bearing system including a metallic inner member that has a bearing surface, and an outer member that at least partially surrounds the inner member. The outer member includes a receiving surface that has a liner system adhered thereto. The liner system includes a wear resistant matrix that has one or more reinforcing fiber systems and one or more polymeric lubricants dispersed therein. The liner system has a wear surface.

In some embodiments, the bearing surface has an initial hardness and a second hardness that is greater than the initial hardness as a result of work hardening caused by in-situ dithering of the inner member relative to the outer member.

In some embodiments, the bearing surface is work hardenable.

In some embodiments, the bearing surface is work hardenable in-situ in the outer member.

In some embodiments, the bearing surface is not work hardenable.

In some embodiments, the wear resistant matrix includes a basal layer which is adhered to the receiving surface. The basal layer includes one or more reinforcing fiber systems. The wear resistant matrix has a wear surface layer which has an wear surface that is in sliding engagement with the bearing surface. The wear surface layer extends between the wear surface and the basal layer. The wear surface layer consists entirely of one or more polymeric lubricants.

In some embodiments, the bearing surface is work hardenable and has an initial hardness. The bearing surface is increased to a second hardness that is greater than the first hardness as a result of work hardening.

In some embodiments, the work hardening is a result of dithering of the inner member relative to the outer member.

There is disclosed herein a wear resistant bearing of any of the preceding embodiments installed in an aircraft or rocket.

There is further disclosed herein a method for selecting materials for a wear resistant bearing. The method includes providing a metallic inner member that has a bearing surface; and an outer member that at least partially surrounds the inner member, the outer member includes a receiving surface that has a liner system adhered thereto, the liner system includes a wear resistant matrix that has one or more reinforcing fiber systems and one or more polymeric lubricants dispersed therein, and the liner system having a wear surface; and selecting one of a work hardenable austenitic stainless steel, a work hardenable nickel-based super alloy, and a work hardenable titanium alloy for the inner member when the wear resistant bearing is employed for a dithering applications.

In some embodiments, the dithering is defined by a bearing stress between the bearing surface and the wear surface of less than 5 ksi, a cyclic frequency of greater than 1 Hz, an angle of oscillation of less than or equal to ±5 degrees and at a temperature of about 18 degrees Celsius (65 degrees Fahrenheit) to about 24 degrees Celsius (75 degrees Fahrenheit).

There is further disclosed herein a method for selecting materials for a wear resistant bearing. The method includes providing a metallic inner member that has a bearing surface; and an outer member that at least partially surrounds the inner member, the outer member includes a receiving surface that has a liner system adhered thereto, the liner system includes a wear resistant matrix that has one or more reinforcing fiber systems and one or more polymeric lubricants dispersed therein, and the liner system having a wear surface; selecting a metallic material that is not work hardenable for the inner member when the wear resistant bearing is employed for a dithering application; and selecting the wear resistant matrix that includes a basal layer which is adhered to the receiving surface, the basal layer includes one or more reinforcing fiber systems, the wear resistant matrix has a wear surface layer which has an wear surface that is in sliding engagement with the bearing surface, the wear surface layer extends between the wear surface and the basal layer, the wear surface layer consisting entirely of one or more polymeric lubricants when the wear resistant bearing is employed for cryogenic applications.

In some embodiments, the dithering is defined by a bearing stress between the bearing surface and the wear surface of about 5 ksi to about 40 ksi, a cyclic frequency of greater than or equal to 0.3 Hz, an angle of oscillation of less than or equal to about 45 degrees to about degrees and the cryogenic application are defined by a temperature of about negative 184 degrees Celsius (negative 300 degrees Fahrenheit) to about negative 59 degrees Celsius (negative degrees Fahrenheit).

There is further disclosed herein a method of work hardening a bearing component. The method includes providing a metallic inner member that has a bearing surface; and an outer member that at least partially surrounds the inner member, the outer member includes a receiving surface that has a liner system adhered thereto, the liner system includes a wear resistant matrix that has one or more reinforcing fiber systems and one or more polymeric lubricants dispersed therein, and the liner system has a wear surface; and work hardening the bearing surface in-situ while the outer member is in dithering relation with the inner member.

In some embodiments, the dithering relation is defined by a bearing stress between the bearing surface and the wear surface of less than 5 ksi, a cyclic frequency of greater than 1 Hz, an angle of oscillation of less than or equal to ±5 degrees and at a temperature of about 18 degrees Celsius (65 degrees Fahrenheit) to about 24 degrees Celsius (75 degrees (Fahrenheit).

In some embodiments, the dithering is defined by a bearing stress between the bearing surface and the wear surface of about 5 ksi to about 40 ksi, a cyclic frequency of greater than or equal to 0.3 Hz, and an angle of oscillation of less than or equal to about 45 degrees to about 55 degrees. The method includes performing the dithering in a cryogenic application defined by a temperature of about negative 184 degrees Celsius (negative 300 degrees Fahrenheit) to about negative 59 degrees Celsius (negative 75 degrees Fahrenheit).

There is disclosed herein a wear resistant bearing system that includes an inner member that has an internal core and a bearing surface which has a 50 Rockwell C scale hardness or greater. The inner member has a chemical composition that is uniform throughout the internal core, the case layer and the bearings surface. The wear resistant bearing system includes an outer member that partially surrounds the inner member. The outer member includes a receiving surface that has liner system adhered thereto. The liner system includes a wear resistant matrix with one or more reinforcing fiber systems and has one or more lubricative fibers system dispersed in the wear resistant matrix. The liner system has a wear resistant surface that has portions of both the reinforcing fiber system and the lubricative fiber systems. The wear resistant surface is continuous.

In some embodiments, the chemical composition of the inner member is a nickel-based super alloy. In some embodiments, the chemical composition of the nickel based super alloy includes 50.0 to 55.0 percent by mass Nickel, 17.0 to 21.0 percent by mass Chromium, 2.8 to 3.3 percent by mass Molybdenum, total combined percent by mass of Niobium and Tantalum is between 4.75 and 5.5, 0.0 to 1.0 percent by mass Cobalt, 0.0 to 0.35 percent by mass Manganese, 0.0 to 0.3 percent by mass Copper, 0.2 to 0.8 percent by mass Aluminum, 0.65 to 1.15 percent by mass Titanium, 0.0 to 0.35 percent by mass Silicon, 0.0 to 0.08 percent by mass Carbon, 0.0 to 0.015 percent by mass Sulfur, 0.0 to 0.015 percent by mass Phosphorus, and 0.0 to 0.006 percent by mass Boron, and balance Iron.

In some embodiments, the chemical composition of the inner member comprises a titanium based alloy. In some embodiments, the chemical composition of the titanium based alloy comprises 5.50 to 6.75 percent by mass Aluminum, 3.50 to 4.50 percent by mass Vanadium, maximum of 0.30 percent by mass Iron, maximum of 0.20 percent by mass Oxygen, maximum of 0.08 percent by mass Carbon, maximum of 0,005 percent by mass Nitrogen (500 ppm), maximum of 0.0125 percent by mass Hydrogen 9125 ppm), maximum of 0.005 percent by mass Yttrium 0.005 (50 ppm), maximum of 0.10 percent by mass of each of other elements, maximum of 0.040 percent by mass, total, for all other elements, remainder Titanium.

In some embodiments, the internal core has a 36 to 46 Rockwell C scale hardness. In some embodiments, the bearing surface has 50 to 58 Rockwell C scale hardness. In some embodiments, the bearing surface has about a 51 Rockwell C scale hardness.

In some embodiments, the wear resistant matrix is exposed to the wear resistant surface and ditheringly engages the bearing surface.

In some embodiments, the bearing surface includes microscopic asperities, and the wear resistant surface ditheringly engages the microscopic asperities.

In some embodiments, the inner member includes a case layer that has a case depth of about 0.0076 cm (0.0030 inches) and the case layer has a 50 Rockwell C scale hardness or greater.

In some embodiments, the inner member includes a case layer that has a case depth of about 0.0076 cm (0.0030 inches) and the case layer has a 48 Rockwell C scale hardness or greater.

In some embodiments, the inner member includes a case layer that has a case depth from about 0.000254 cm (0.0001 inches) to about 0.000508 cm (0.0002 inches) and the case layer has a 48 Rockwell C scale hardness or greater.

In some embodiments, the lubricative fiber systems include polytetrafluoroethylene (PTFE), ethylene tetrafluoroethylene (ETFE) and/or high density polyethylene (HDPE).

In some embodiments, the reinforcing fiber system includes aramid, glass, polyester, polyamide, polyimide and/or polyphenylene sulfide.

In some embodiments, the reinforcing fiber system includes or is a woven fabric.

In some embodiments, the dithering is defined by a bearing stress between the bearing surface and the wear resistant surface of less than 40 ksi, a cyclic frequency of greater than or equal to 0.3 Hz, a total angle of oscillation of less than or equal to 90 degree and a temperature of less than 232 degrees Celsius (450 degrees Fahrenheit), and wherein the total angle of oscillation comprises clockwise and counterclockwise movement.

In some embodiments, the bearing's surface is substantially continuous and has a surface finish of less than 16 Ra.

In some embodiments, the wear resistant bearing is installed in an aircraft or rocket. In some embodiments, the aircraft includes a Boeing 737 aircraft, an F-22 aircraft and an F-35 aircraft. In some embodiments, the wear resistant bearing is installed in a fixed wing aircraft component, a rotary wing aircraft component or an actuation system for a flight control surface of a fixed wing aircraft. In some embodiments, the flight control surfaces include rudders, horizontal stabilizers, elevators, flaps, ailerons, elevons, spoilers, speed brakes and slats. In some embodiments, the fixed wing aircraft components include thrust reversers, blocker doors, engine mounts, landing gear trunnions, landing gear up-lock latches, landing gear doors, control rods, auxiliary power unit mounts, intake and exhaust port valves for fuel cells. In some embodiments, the rotary wing aircraft flight components control surfaces include control rods, pitch links, lead lag link, lead lag damper, swash plate, tail rotor links, engine mounts, auxiliary power unit mounts, and landing gear components.

There is further disclosed herein a method of manufacturing a wear resistant bearing. The method includes providing an inner member that has an internal core and a bearing surface. The inner member has a chemical composition that is uniform throughout the internal core and the bearings surface. The chemical composition is a nickel-based super alloy or a titanium based alloy. The method includes providing an outer member that partially surrounds the inner member. The outer member includes a receiving surface that has a liner system adhered thereto. The liner system includes a wear resistant matrix with one or more reinforcing fiber systems and has one or more lubricative fiber systems dispersed in the wear resistant matrix. The liner system has a wear resistant surface that has portions of both the reinforcing fiber system and the lubricative fiber system. The method includes work hardening the bearing surface to a 50 Rockwell C scale hardness or greater.

In some embodiments, the work hardening is tumbling, hard turning, shot peening, burnishing, in-situ dithering and/or vibratory finishing.

In some embodiments, the method includes work hardening the bearing surface to a 50 to 58 Rockwell C scale hardness.

There is disclosed herein, an actuation system for an aircraft component and a flight control surface of an aircraft. The actuation system includes an actuator that is fixed to the aircraft and has an actuator arm movably extending from the actuator. The actuation system includes an actuator pivot assembly that includes an actuator clevis that has a first leg and a second leg, and a first hole extends through the first leg and a second hole extends through the second leg. An actuator pin extends through and is secured in the first hole and the second hole. A housing has a connection end that has the actuator arm secured thereto. A housing bore extends through the housing. A first wear resistant bearing is disposed in the actuator clevis. The first wear resistant bearing has a mounting bore extending through the inner member and the outer member has a radially outermost exterior surface. The radially outermost exterior surface is seated in the housing bore. A central portion of the actuator pin is seated in the mounting bore of the inner member.

In some embodiments, the chemical composition of the inner member is a nickel-based super alloy. In some embodiments, the chemical composition of the inner member is a titanium based alloy.

In some embodiments, the bearing surface has 50 to 58 Rockwell C scale hardness. In some embodiments, the bearing surface has about a 51 Rockwell C scale hardness.

In some embodiments, actuation system is installed in a horizontal stabilizer of the aircraft (e.g., a Boeing 737 aircraft). The horizontal stabilizer is pivotally connected to the aircraft about a pivot axis defined by the actuator pin. The actuator arm is connected to the horizontal stabilizer at a distance away from the pivot axis.

In some embodiments, actuation system is installed in a horizontal tail of the aircraft (e.g., an F-35 aircraft). The horizontal tail is pivotally connected to the aircraft about a pivot axis. A first wear resistant bearing system has a first mounting bore extending through the inner member and the outer member has a first radially outermost exterior surface. The first radially outermost exterior surface is seated in the housing bore. A central portion of the actuator pin is seated in the first mounting bore.

In some embodiments, the actuation system includes an inboard clevis that is secured to the horizontal tail and has a third leg and a fourth leg. A third hole extends through the third leg and a fourth hole extends through the fourth leg. An inboard pin extends through and is secured in the third hole and the fourth hole. An inboard tab is secured to the aircraft and has an inboard bore extending therethrough. The actuation system includes a second wear resistant bearing system that has a second mounting bore that extends through inner member and the outer member has a second radially outermost exterior surface. The second radially outermost exterior surface is seated in the inboard bore. A central portion of the inboard pin is seated in the second mounting bore.

In some embodiments, the actuation system includes an outboard clevis that is secured to the horizontal tail and has a fifth leg and a sixth leg. A fifth hole extends through the fifth leg and a sixth hole extends through the sixth leg. An outboard pin extends through and is secured in the fifth hole and the sixth hole. An outboard tab is secured to the aircraft and has an outboard bore extending therethrough. The actuation system includes a third wear resistant bearing system that has a third mounting bore extending through the inner member. The outer member has a third radially outermost exterior surface. The third radially outermost exterior surface is seated in the outboard bore. A central portion of the outboard pin is seated in the third mounting bore of the inner member.

In some embodiments, the actuation system is for an aircraft (e.g., an F-22 aircraft). The actuation system includes an actuator that is fixed to the aircraft and has an actuator arm movably extending from the actuator. In some embodiments, the actuation system includes an actuator pivot assembly that includes an actuator clevis that has a first leg and a second leg. A first hole extends through the first leg and a second hole extends through the second leg. An actuator pin extends through and is secured in the first hole and the second hole. The pivot assembly includes a housing that has a connection end with the actuator arm secured thereto. A housing bore extends through the housing. The pivot assembly includes a plurality of the wear resistant bearing systems that each have a mounting bore that extends through the respective inner member. Each of the respective outer members has a radially outermost exterior surface. The radially outermost exterior surface is seated in the housing bore. A central portion of the actuator pin is seated in the mounting bore of the inner member. The plurality of wear resistant bearing systems are coaxially mounted between the aircraft and a rudder of the aircraft. The actuator arm engages the rudder for pivoting the rudder relative to the aircraft about a pivot axis.

There is disclosed herein a pivoting mechanism for an aircraft or rocket. The pivoting mechanism includes a clevis mounted to the aircraft or rocket and a wear resistant bearing system disposed in the clevis such that the inner member is in fixed relation to the clevis and the outer member is moveable relative to the inner member about a pivot axis.

BRIEF DESCRIPTION OF THE DRAWINGS

Referring now to the Figures, which are exemplary embodiments, and wherein the like elements are numbered alike.

DETAILED DESCRIPTION

Figure 1A:
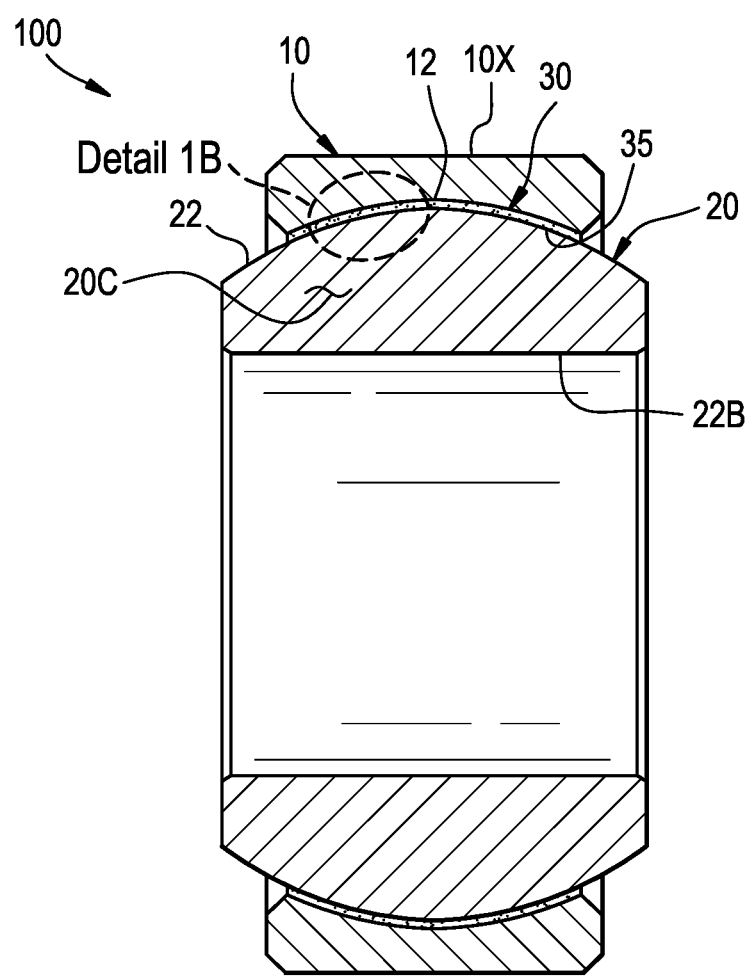
FIG. 1A is a cross sectional view of a spherical bearing with a self-lubricating liner therein.

As shown in FIG. 1A, a wear resistant spherical bearing is generally designated by the numeral 100. The wear resistant spherical bearing 100 includes a metallic inner member that has a bearing surface 22 that is work hardenable (i.e., strain hardenable) and has an initial hardness. The metallic inner member 20 can also include a mounting bore 22B. The initial hardness is less than 50 HRC, and preferably less than 45 HRC, and more preferably between 36 HRC and 45 HRC. The wear resistant spherical bearing 100 includes an outer member 10 that partially surrounds the inner member 20. The outer member 10 has a radially outermost exterior surface 10X and includes a receiving surface 12 that has a liner system 30 adhered thereto.

Figure 6:
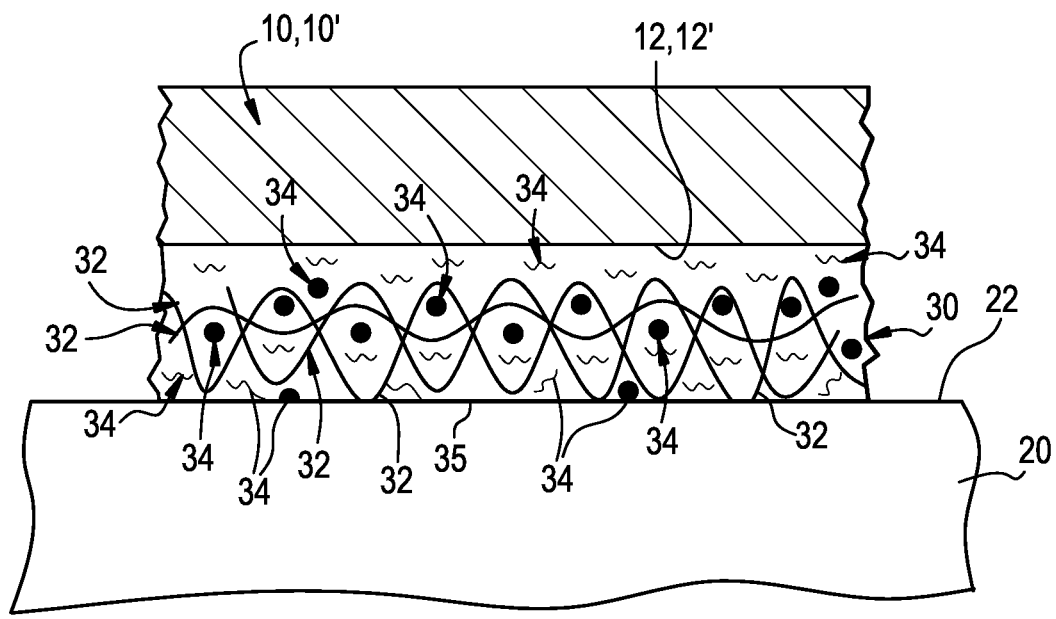
FIG. 6 is a schematic cross sectional view of another embodiment of the self-lubrication liner of FIGS. 1 and 2.

As shown in FIG. 1A, the wear resistant bearing system 100 includes, the bearing inner member 20 that has an internal core 20C and the bearing surface 22 has at least a 50 Rockwell C scale hardness. The inner member 20 has a chemical composition that is uniform throughout the internal core 20C and the bearing surface 22. The wear resistant bearing system 100 includes the outer member 10 that is shown partially surrounding the inner member 20. The outer member 10 has a receiving surface 12 that has a liner system 30 adhered thereto. The liner system 30 includes a wear resistant matrix that has a reinforcing fiber system 32 (i.e., for structural reinforcement) and has at one or more lubricative fibers 34 (e.g., polymeric lubricants) dispersed in the wear resistant matrix. The liner system 30 has a wear resistant surface 35 that includes portions of both the reinforcing fiber system 32 and the lubricative fiber system 34. As shown in FIG. 6, some of the reinforcing fiber system 32 and the lubricative fiber system 34 are exposed to or are coexistent with the wear resistant surface 35 and contact the bearing surface 22. In some embodiments portions, ends, edges and/or lateral sides of the reinforcing fiber system 32 are exposed to or are coexistent with the wear resistant surface 35. In some embodiments portions, ends, edges and/or lateral sides of the lubricative fiber system 34 are exposed to or are coexistent with the wear resistant surface 35. The wear resistant surface 35 is continuous (i.e., un interrupted, with no grooves, slots or seams therein). In some embodiments, the wear resistant bearing system 100 is employed in cryogenic applications, such as for high altitude rockets.

In some embodiments, the internal core 20C has a 36 to 46 Rockwell C scale hardness. In some embodiments, the bearing surface 22 has 50 to 58 Rockwell C scale hardness.

In some embodiments, the bearing surface 22 has about (e.g., plus or minus 2) a 51 Rockwell C scale hardness.

Figure 1B:
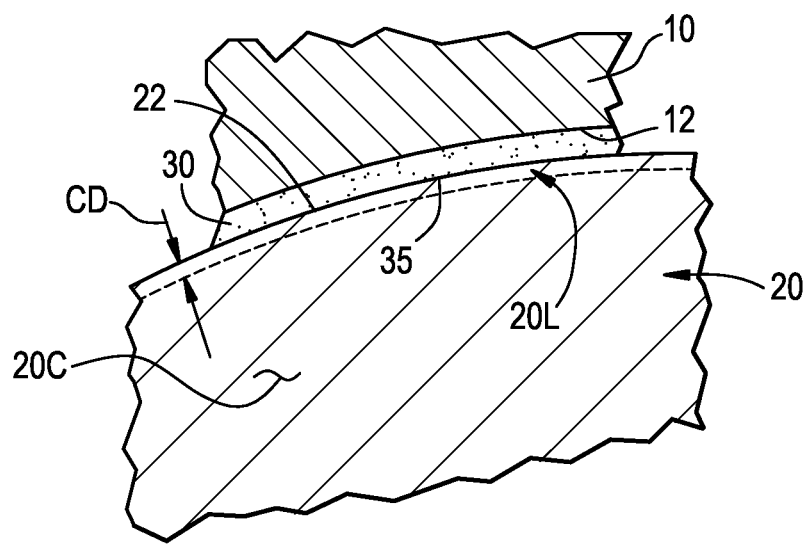
FIG. 1B is an enlarged view of detail 1B of FIG. 1A.

As shown in FIG. 1B, the inner member 20 has a case layer 20L that has a case depth CD of about 0.0076 cm (0.0030 inches) and the case layer 20L has at least a 50 Rockwell C scale hardness. In some embodiments, the case layer 20L has a case depth CD of about 0.0076 cm (0.0030 inches) and the case layer 20L has at least a 48 Rockwell C scale hardness. In some embodiments, the case depth CD is from about 0.000254 cm (0.0001 inches) to about 0.000508 cm (0.0002 inches) and the case layer 20L has at least a 48 Rockwell C scale hardness.

Figure 3:
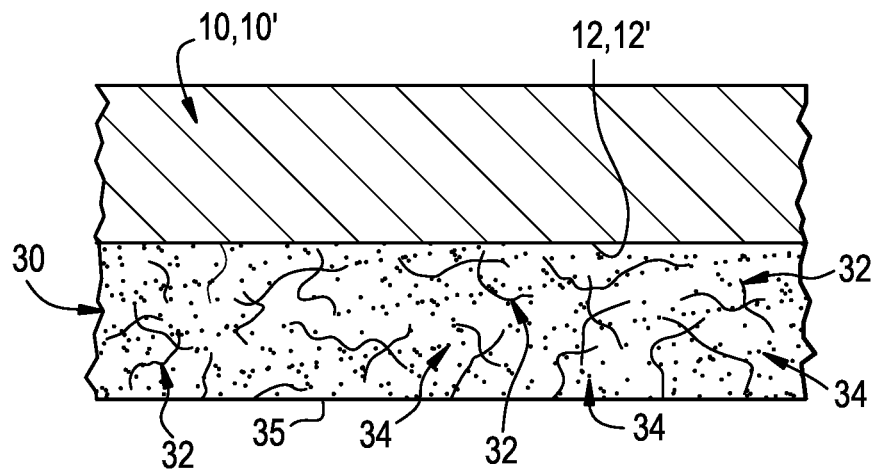
FIG. 3 is a schematic cross sectional view of one embodiment of the self-lubrication liner of FIGS. 1 and 2.
Figure 5:
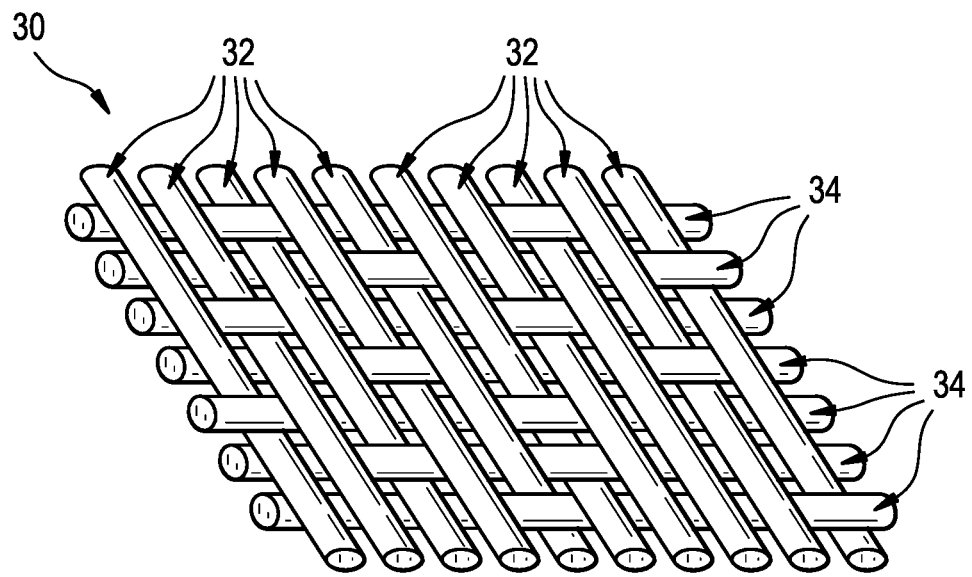
FIG. 5 is an isometric view of an embodiment of the reinforcing/lubricative fiber weave within the liner in shown in FIGS. 1 and 2.

As shown in FIG. 3, the liner system 30 includes a wear resistant matrix that is defined by the reinforcing fiber systems 32 (e.g., aramid, glass, polyester, polyamide, polyimide, and/or polyphenylene sulfide fibers) and one or more lubricative fibers 34 (e.g., self-lubricating fibers or polymeric lubricants) dispersed in the wear resistant matrix. In some embodiments, the reinforcing fibers are short fibers which are used in so called machinable liners that can be molded and machined. In other embodiments short fibers are woven together through various processes where the fibers cross over and are entangled to form a stronger composite, as shown in FIG. 5. The liner system 30 has a wear resistant surface 35. The initial hardness of the bearing surface 22 of the inner member 20 is increased to a second hardness that is greater than the first hardness as a result of work hardening caused by in-situ dithering of the inner member 20 relative to the outer member 10. The second hardness is greater than 50 HRC, and preferably about 50 HRC to about 58 HRC.

Figure 4:
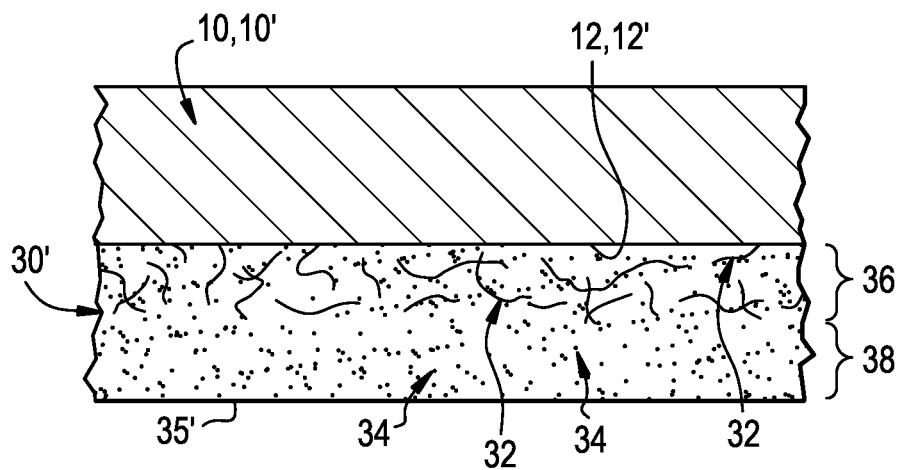
FIG. 4 is a schematic cross sectional view of another embodiment of the self-lubrication liner of FIGS. 1 and 2.

Referring to FIG. 4, the outer member 10, 10' has a receiving surface 12, 12' that has a liner system 30' adhered thereto. The liner system 30' has a wear resistant matrix that includes a basal layer 36 which is adhered to the receiving surface 12, 12'. The basal layer 36 has one or more reinforcing fiber systems 32. The wear resistant matrix has a wear surface layer 38 which has a wear resistant surface 35'.

FIG. 5 is an embodiment of reinforcing fibers 32 and lubricative fiber system 34 woven together in a woven pattern. In the exemplary embodiment illustrated in FIG. 5, the reinforcing fibers 32 run from the top to the bottom of the figure interwoven in a pattern with lubricative fibers in the lubricative fiber system 34 running horizontally.

In some embodiments of the woven pattern there can be more, the same, less, or no lubricative fibers as compared to reinforcing fibers. In some embodiments, woven fibers encapsulated in a resin are used to form a stronger composite than when a composite material consists of randomly oriented fibers.

Referring to FIG. 6, the liner system 30 includes a composite matrix in which the lubricative fibers in the lubricative fiber system 34 are a plurality of Polytetrafluoroethylene (PTFE) fibers intermixed (i.e. woven) with the reinforcing fibers 32 and encapsulated within a liner system 30 (e.g., a polymer matrix). In FIG. 6 the lubricative fibers in the lubricative fiber system 34 are shown as additives to the resin matrix and as woven with the reinforcing fibers 32. The black circles shown in FIG. 6 illustrate some of the lubricative fibers in the lubricative fiber system 34 in a cross section view (i.e., extending in and out of the page), that is, when the lubricative fibers 34 length direction is normal to the cross-section. Other lubricative fibers in the lubricative fiber system 34 are also shown in a woven manner in FIG. 6. The lubricative fibers 34 shown are woven in a pattern with the reinforcing fibers 32. The reinforcement fibers 32 add to the strength and the rigidity of the liner system 30 to accommodate the need to provide stiff compliance at high loads. The reinforcement fibers 32 may be made from, but are not limited to: aramid, glass, polyester, polyamide, polyimide, and/or polyphenylene sulfide. In some embodiments, the liner system 30 is has a polymer resin matrix which may be made from, but not limited to, thermoset resins (such as phenolic and polyimide), acrylic resins, nitrile phenolic resins, epoxy resins, or other suitable resin system and potential additives to enhance composite performance. As shown in FIG. 6, some of the reinforcing fiber system 32 and the lubricative fiber system 34 are exposed to or are coexistent with the wear resistant surface 35 and contact the bearing surface 22.

Figure 2:
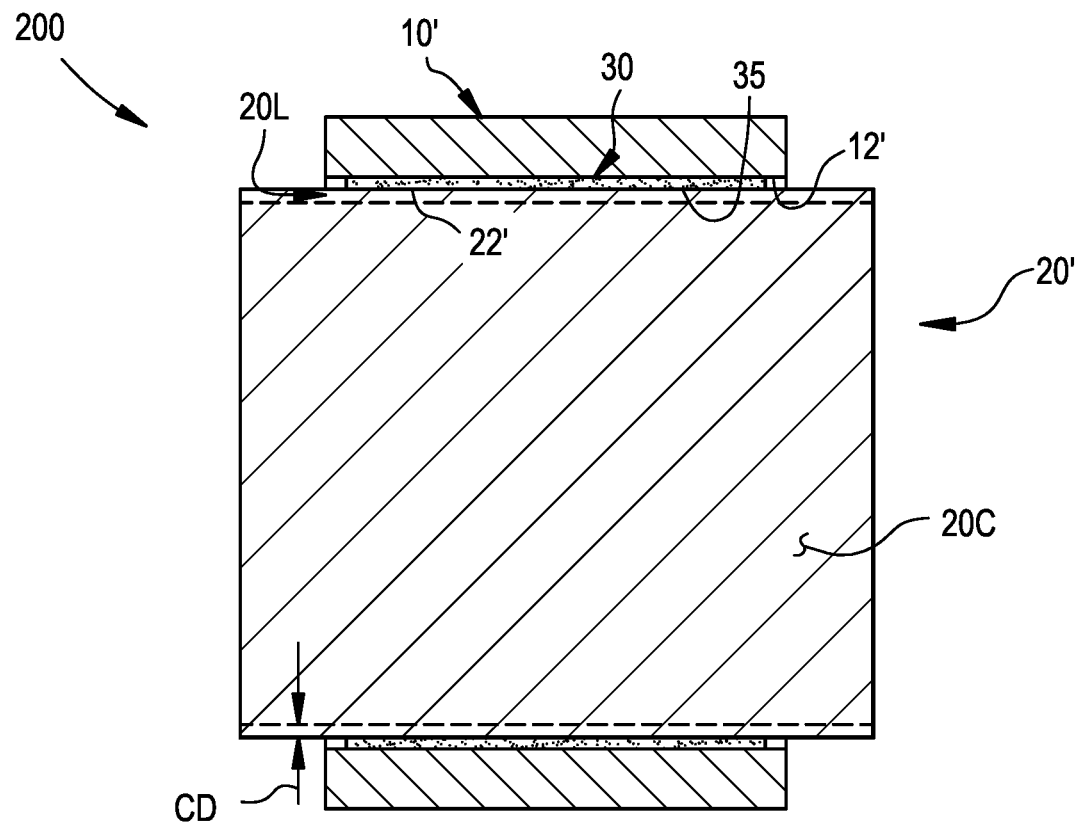
FIG. 2 is a cross sectional view of a journal bearing with a self-lubricating liner therein.

There is disclosed herein a wear resistant bearing system 100, 200 for dithering applications, as shown in FIGS. 1A and 2, for example. The wear resistant bearing system 100, 200 includes a metallic inner member 20, 20' that has a bearing surface 22, 22' that is work hardenable. The wear resistant bearing system 100, 200 includes an outer member 10, 10' that partially surrounds the inner member 20, 20'. The outer member 10, 10' has a receiving surface 12, 12' that has a liner system 30 adhered thereto, as shown in FIG. 6. The liner system 30 includes a composite system incorporating a lubricative fiber system 34 with a plurality of lubricative fibers therein (e.g., self-lubricating Polytetrafluoroethylene (PTFE) fibers) intermixed (i.e. woven) with structural reinforcing fibers 32 and encapsulated within a polymer resin matrix. The reinforcing fibers 32 add to the strength and the rigidity of the liner system 30 to accommodate the need to provide stiff compliance at high loads. The reinforcing fibers 32 are made from, but are not limited to: aramid, glass, polyester, polyamide, polyimide, and/or polyphenylene sulfide. In some embodiments, the liner system 30 is has a polymer resin matrix which may be made from, but not limited to, thermoset resins (such as phenolic and polyimide), acrylic resins, nitrile phenolic resins, epoxy resins, or other suitable resin system and potential additives to enhance composite performance. The liner system 30 is adhered to the receiving surface 12, 12' and has a wear resistant surface 35 that is in sliding engagement with the bearing surface 22, 22'.

While a wear resistant spherical bearing 100 is shown and described, the present disclosure is not limited in this regard as other types of bearings are encompassed by the present disclosure including but not limited to journal bearings 200 having a cylindrical outer member with the liner system 30 adhered to a concave inner surface 12' of the outer member 10' and having an inner member 20' (e.g., a shaft with a bearing surface 22') extending through the outer member 10', as shown in FIG. 2.

In some embodiments, the dithering is defined by a bearing stress between the bearing surface 22 and the wear resistant surface 35 of less than 40 ksi, a cyclic frequency of greater than or equal to 0.3 Hz, a total angle of oscillation of less than or equal to 90 degree and a temperature of less than 232 degrees Celsius (450 degrees Fahrenheit), and wherein the total angle of oscillation comprises clockwise and counterclockwise movement.

In some embodiments, the bearings surface 22 is substantially continuous and has a surface finish of less than 16 Ra.

In some embodiments, the wear resistant bearing 100 is installed in an aircraft or rocket. In some embodiments, the aircraft is a Boeing 737 aircraft, an F-22 aircraft and/or an F-aircraft. In some embodiments, the wear resistant bearing 100 is installed in an actuation system for a flight control surface or other components of aircraft. In some embodiments, the flight control surface or other components are in a fixed wing aircraft and/or rotary wing aircraft. In some embodiments, the flight control surfaces in fixed wing air craft include. In some embodiments, the other components in fixed wing aircraft include, but are not limited to, thrust reversers, blocker doors, engine mounts, landing gear components (trunnions, uplock latch, gear doors), control rods, auxiliary power unit mounts, hydrogen fuel cell (intake/exhaust port valve).

In some embodiments, for the rotary wing aircraft, applications that employ the wear resistant bearing 100 include, but are not limited to, control rods, pitch links, lead lag dampers, swash plates, lead lag link, tail rotor links, engine mounts, auxiliary power unit mounts and/or landing gear control rods, pitch links, lead lag link, lead lag damper, swash plate, tail rotor links, engine mounts, auxiliary power unit mounts, and landing gear components.

As a result of significant testing and analysis, Applicant has surprisingly discovered that when several conditions and material combinations are optimized that the bearing surface 22, 22' can be structurally transformed (i.e., work hardened) by the in-situ dithering of the inner member 20 relative to the outer member 10 for specific materials for the inner member 20, configuration of the liner system 30, and the dithering conditions, as disclosed and claimed further herein. Applicant further surprisingly discovered that the polymeric lubricant was maintained in the liner system during the forgoing dithering operations. Applicant also surprisingly discovered that the in-situ work hardening did not necessarily occur for configurations outside of the optimized conditions and material combinations disclosed herein.

As used herein, the term "super alloy" means a mixture of chemical elements including at least one metal element that has the ability to operate at high fractions of its melting point, and will be understood as synonymous with the terms "superalloy" and "high-performance alloy." In some embodiments, the inner member is manufactured from an austenitic stainless steel, a nickel-based super alloy (e.g., Inconel® which is a registered trademark of Huntington Alloys Corporation) or a titanium alloy, such as Ti-6Al-4V (e.g., AMS 4965N). In some embodiments, the nickel-based super alloy has a chemical composition in mass percent (i.e., weight percent) of 50.0 to 55.0 percent by mass Nickel, 17.0 to 21.0 percent by mass Chromium, 2.8 to 3.3 percent by mass Molybdenum, 4.75 to 5.5 percent by mass Niobium and Tantalum (i.e., total combined percent by mass of Niobium and Tantalum is between 4.75 and 5.5), 0.0 to 1.0 percent by mass Cobalt, 0.0 to 0.35 percent by mass Manganese, 0.0 to 0.3 percent by mass Copper, 0.2 to 0.8 percent by mass Aluminum, 0.65 to 1.15 percent by mass Titanium, 0.0 to 0.35 percent by mass Silicon, 0.0 to 0.08 percent by mass Carbon, 0.0 to 0.015 percent by mass Sulfur, 0.0 to 0.015 percent by mass Phosphorus, and 0.0 to 0.006 percent by mass Boron, and balance Iron (between 24.6 and 11.134 percent by mass Iron). In some embodiments, the nickel-based super alloy has a chemical composition that includes at least 45 percent by mass Nickel. In some embodiments, the nickel-based super alloy has a chemical composition that includes at least 15 percent by mass Chromium. In some embodiments, the nickel-based super alloy has a chemical composition that includes at least 45 percent by mass Nickel and at least 15 percent by mass Chromium. In some embodiments, the nickel-based super alloy has a face centered cubic structure. In some embodiments, the nickel-based super alloy is face centered cubic austenitic.

In some embodiments the titanium based alloy has a chemical composition, in mass percent (i.e., weight percent), of 5.50 to 6.75 percent by mass Aluminum, 3.50 to 4.50 percent by mass Vanadium, maximum of 0.30 percent by mass Iron, maximum of 0.20 percent by mass Oxygen, maximum of 0.08 percent by mass Carbon, maximum of 0,005 percent by mass Nitrogen (500 ppm), maximum of 0.0125 percent by mass Hydrogen 9125 ppm), maximum of 0.005 percent by mass Yttrium 0.005 (50 ppm), maximum of 0.10 percent by mass of each of other elements, maximum of 0.040 percent by mass, total, for all other elements, remainder Titanium.

In some embodiments, the wear resistant matrix is exposed to the wear resistant surface 35, 35' and ditheringly engages the bearing surface 22, 22'. In some embodiments the dithering causes causing the work hardening of the bearing surface 22, 22'. In some embodiments, the bearing surface 22, 22' includes microscopic asperities, and the wear resistant surface 35, 35' ditheringly engages and work hardens the microscopic asperities.

In some embodiments, the lubricative fibers 34 include a polymeric lubricant that remains in the wear resistant matrix. For example, the polymeric lubricant does not readily draw forth from the wear resistant matrix to form a protective transfer film such that wear is governed by the wear resistant matrix. In some embodiments, the polymeric lubricant is a polytetrafluoroethylene (PTFE), an ethylene tetrafluoroethylene (ETFE), and/or a high density polyethylene (HDPE).

In some embodiments, the dithering is defined by a bearing stress between the bearing surface and the wear resistant surface of less than 5 ksi, a cyclic frequency of greater than 1 Hz, an angle of oscillation of less than or equal to ±5 degrees and at a temperature of about 18 degrees Celsius (65 degrees Fahrenheit) to about 24 degrees Celsius (75 degrees (Fahrenheit).

As a result of significant testing and experimentation, the Applicant has surprisingly discovered that when the bearing surface 22, 22' of the inner member 20, 20' does not have the ability to be work hardened, that the microscopic asperities on the bearing surface 22, 22' embrittle and shear from the bearing surface 22, 22' during operation of the bearing 100, 200 and oxidize into micro and nano sized hard ceramic wear debris which become embedded in the wear resistant matrix of the liner system 30 and during dithering operation of the bearing, the bearing surface 22, 22' experiences autologous fretting wear in which the bearing surface 22, 22' becomes rougher and reduces in dimensions. Thus, when the bearing surface 22, 22' of the inner member 20, 20' does have the ability to be work hardened the Applicant has surprisingly discovered that the use of a liner system 30' (see FIG. 4) that has a wear resistant matrix with a basal layer 36 which is adhered to the receiving surface 12, 12', the basal layer 36 includes one or more reinforcing fiber systems 32; and the wear resistant matrix has a wear surface layer 38 which has an wear resistant surface 35' that is in sliding engagement with the bearing surface 22, 22'; the wear surface layer 38 extends between the wear resistant surface 35' and the basal layer 36; and, the wear surface layer 38 consists entirely of at least one polymeric lubricant, to prevent the autologous fretting wear described herein.

There is disclosed herein a wear resistant bearing system 100, 200 for dithering applications, as shown in FIGS. 1 and 2, for example. The wear resistant bearing system 100, 200 includes a metallic inner member 20, 20' that has a bearing surface 22, 22' that is work hardenable. The wear resistant bearing system 100, 200 includes an outer member 10, 10' that partially surrounds the inner member 20, 20'. The outer member 10, 10' has a receiving surface 12, 12' that has a liner system 30' adhered thereto, as shown in FIG. 4. The liner system 30' has a wear resistant matrix that includes a basal layer 36 which is adhered to the receiving surface 12, 12'. The basal layer 36 has one or more reinforcing fiber systems 32. The wear resistant matrix has a wear surface layer 38 which has a wear resistant surface 35' that is in sliding engagement with the bearing surface 22, 22'. The wear surface layer 38 extends between the wear resistant surface 35' and the basal layer 36. The wear surface layer 38 consists entirely of one or more polymeric lubricants. In some embodiments, the basal layer 36 includes one or more polymeric lubricants embedded in the reinforcing fiber system 32.

In some embodiments of the liner system 30' shown in FIG. 4, the wear resistant matrix has a semi-crystalline or crystalline film-forming polymer (e.g., polyimide or nitrilephenolic) in the wear surface layer 38 and/or the basal layer 36. In some embodiments, the wear resistant surface 35' of the liner system 30' is ablated using glass bead ablation.

As a result of significant testing and experimentation, Applicant has surprisingly discovered that in cryogenic temperature ranges the bearing systems 100, 200 wear based upon the bearing surface 22, 22' and not the liner system 30 because the polymeric lubricants in the liner system 30 are below the glass transition temperature and the Applicant has surprisingly discovered that the properties on the inner member 20, 20 that resist wear are low temperature ductility, corrosion resistance, and the ability of the bearing surface 22, 22' to work harden without necking; and that suitable metallic alloys for the inner member 20, 20' are un-worked austenitic stainless steels, nickel-based super alloys, and titanium alloys.

Based upon the foregoing discovery, there is disclosed herein a wear resistant bearing system 100, 200 for cryogenic applications. The wear resistant bearing system 100, 200 for cryogenic applications includes a metallic (e.g., un-worked austenitic stainless steel, a nickel-based super alloy, and a titanium alloy) inner member 20, 20' that has a bearing surface 22, 22' with an initial hardness and is work hardenable. The wear resistant bearing system 100, 200 for cryogenic applications includes an outer member 10, 10' that partially surrounds the inner member 20, 20'. The outer member 10, 10' has a receiving surface 12, 12' that has a liner system 30 adhered thereto. The liner system 30 has a wear resistant matrix that includes one or more reinforcing fiber systems 32 and has one or more polymeric lubricants dispersed in the wear resistant matrix. The liner system 30 has a wear resistant surface 35. The initial hardness of the bearing surface 22, 22' of the inner member 20, 20' is increased to a second hardness that is greater than the first hardness as a result of work hardening. Thus, the bearing surface 22, 22' is work hardenable. In some embodiments, the bearing surface 22, 22' is work hardenable without substantial necking. In some embodiments, the work hardening is caused by dithering of the inner member 20, 20' relative to the outer member 10, 10'.

In some embodiments, the inner member 20, 20' has a plating (e.g., a chromium plating) on the bearing surface 22, 22'. In some embodiments, the plating is AMS 2438 chromium plating.

In some embodiments of the cryogenic applications, the dithering is defined by a frequency of greater than or equal to 0.3 Hz angles of oscillation of about 45 to about 55 degrees at temperature range of about negative 184 degrees Celsius (negative 300 degrees Fahrenheit) to about negative 59 degrees Celsius (negative 75 degrees Fahrenheit) and at a bearing stress of about 5 ksi to about 40 ksi between the bearing surface and the liner system.

There is disclosed herein a wear resistant bearing system 100, 200 that includes a metallic inner member 20, 20' that has a bearing surface 22, 22'. The wear resistant bearing system 100, 200 includes an outer member 10, 10' that partially surrounds the inner member 10, 10' The outer member 10, 10' has a receiving surface 12, 12' that has liner system 30 adhered thereto. The liner system 30 has a wear resistant matrix that includes one or more reinforcing fiber systems 32 and has one or more polymeric lubricants dispersed in the wear resistant matrix. The liner system 30 has a wear resistant surface 35. The bearing surface 22, 22' has an initial hardness. The bearing surface 22, 22' of the inner member 20, 20' has a second hardness that is greater than the first hardness as a result of work hardening caused by in-situ dithering of the inner member 20, 20' relative to the outer member 10, 10'. In some embodiments, the bearing surface 22, 22' is work hardenable, and is preferably work hardenable in-situ in the outer member 10, 10'.

In some embodiments, the bearing surface 22, 22' is not work hardenable. The outer member 10, 10' has a receiving surface 12, 12' that has a liner system 30 adhered thereto, as shown in FIG. 6. The liner system 30 includes a composite system incorporating a plurality of lubricative fibers 34 (e.g., self-lubricating Polytetrafluoroethylene (PTFE) fibers) intermixed (i.e. woven) with structural reinforcement fibers 32 and encapsulated within a polymer resin matrix. The reinforcement fibers 32 add to the strength and the rigidity of the liner system 30 to accommodate the need to provide stiff compliance at high loads. The reinforcement fibers 32 may be made from, but are not limited to: aramid, glass, polyester, polyamide, polyimide, and/or polyphenylene sulfide. In some embodiments, the liner system 30 is has a polymer resin matrix which is one of thermoset resins (such as phenolic and polyimide), acrylic resins, nitrile phenolic resins, epoxy resins, or other suitable resin system and potential additives to enhance composite performance. The liner system 30 is adhered to the receiving surface 12, 12' and has a wear resistant surface 35 that is in sliding engagement with the bearing surface 22, 22'. In some embodiments, the bearing surface 22, 22' has an initial hardness and is work hardenable. The hardness of the bearing surface 22, 22' of the inner member 20, 20' is increased to a second hardness that is greater than the first hardness as a result of work hardening. In some embodiments, the work hardening is a result of dithering of the inner member 20, 20' relative to the outer member 10, 10'.

There is disclosed herein a method for selecting materials for a wear resistant bearing 100, 200. The method includes providing a metallic inner member 20, 20' having a bearing surface 22, 22'; and an outer member 10, 10' that partially surrounds the inner member 20'. The outer member 10, 10' has a receiving surface 12, 12' that has liner system 30 adhered thereto. The liner system 30 has a wear resistant matrix that includes one or more reinforcing fiber systems 32 and has one or more polymeric lubricants dispersed in the wear resistant matrix. The liner system has a wear resistant surface 35. The method includes selecting a work hardenable austenitic stainless steel, a work hardenable nickel-based super alloy, or a work hardenable titanium alloy for the inner member 20, 20' when the wear resistant bearing 100, 200 is employed for a dithering applications. The method includes selecting one of a work hardenable austenitic stainless steel, a work hardenable nickel-based super alloy, and a work hardenable titanium alloy (e.g., AMS TI-18) for the inner member 20, 20' when the wear resistant bearing 100, 200 is employed for a dithering applications. In some embodiments, the dithering is defined by a bearing stress between the bearing surface 22, 22' and the wear resistant surface 35 of less than 5 ksi, a cyclic frequency of greater than 1 Hz, an angle of oscillation of less than or equal to ±5 degrees and at a temperature of about 18 degrees Celsius (65 degrees Fahrenheit) to about 24 degrees Celsius (75 degrees Fahrenheit).

There is disclosed herein a method for selecting materials for a wear resistant bearing 100, 200. The method includes providing a metallic inner member 20, 20' having a bearing surface 22, 22'; and an outer member 10, 10' at least partially surrounding the inner member 20, 20'. The outer member 10, 10' has a receiving surface 12, 12' having liner system adhered thereto. The liner system 30 includes a wear resistant matrix that has one or more reinforcing fiber systems 32 and that has one or more lubricative fibers 34 (e.g., polymeric lubricants) dispersed in the wear resistant matrix. The liner system 30 has a wear resistant surface 35. The method includes selecting a metallic material that is not work hardenable for the inner member 20, 20' when the wear resistant bearing is employed for a dithering application. The method includes selecting the wear resistant matrix that includes a basal layer 36 which is adhered to the receiving surface 12, 12'. The basal layer 36 includes one or more reinforcing fiber systems 32. The wear resistant matrix has a wear surface layer 38 which has a wear resistant surface 35 that is in sliding engagement with the bearing surface 22, 22'. The wear surface layer 38 extends between the wear resistant surface 35 and the basal layer 36. The wear surface layer 38 consists entirely of one or more polymeric lubricants, when the wear resistant bearing 100, 200 is employed for cryogenic applications. In some embodiments, the dithering is defined by a bearing stress between the bearing surface and the wear resistant surface of about 5 ksi to about 40 ksi, a cyclic frequency of greater than or equal to 0.3 Hz, an angle of oscillation of less than or equal to about 45 degrees to about 55 degrees and the cryogenic application are defined by a temperature of about negative 184 degrees Celsius (negative 300 degrees Fahrenheit) to about negative 59 degrees Celsius (negative 75 degrees Fahrenheit).

There is disclosed herein a method of work hardening a bearing component 20, The method includes providing a metallic inner member 20, 20' having a bearing surface 22, 22'; and an outer member 10, 10' that partially surrounds the inner member 20, 20'. The outer member 10, 10' includes a receiving surface 12, 12' that has a liner system 30 adhered thereto. The liner system 30 includes a wear resistant matrix that has one or more reinforcing fiber systems 32 and has one or more polymeric lubricants dispersed in the wear resistant matrix. The liner system 30 has a wear resistant surface 35. The method includes work hardening the bearing surface 22, 22' in-situ while the outer member 10, 10' is in dithering relation with the inner member 10, 10'. In some embodiments, the dithering relation is defined by a bearing stress between the bearing surface and the wear resistant surface of less than 5 ksi, a cyclic frequency of greater than 1 Hz, an angle of oscillation of less than or equal to ±5 degrees and at a temperature of about 18 degrees Celsius (65 degrees Fahrenheit) to about 24 degrees Celsius (75 degrees Fahrenheit).

In some embodiments, the dithering is defined by a bearing stress between the bearing surface 22, 22' and the wear resistant surface 35 of about 5 ksi to about 40 ksi, a cyclic frequency of greater than or equal to 0.3 Hz, an angle of oscillation of less than or equal to about degrees to about 55 degrees. In some embodiments, the method includes performing the dithering in a cryogenic application defined by a temperature of about negative 184 degrees Celsius (negative 300 degrees Fahrenheit) to about negative 59 degrees Celsius (negative 75 degrees Fahrenheit).

There is disclosed herein a method of manufacturing wear resistant bearing 100 which includes providing an inner member 20 that has an internal core 20C and a bearing surface 22. The inner member 20 has a chemical composition that is uniform throughout the internal core 20C, the case layer 20L and the bearings surface 22, the chemical composition is a nickel-based super alloy or a titanium based alloy. The method includes providing an outer member 10 that at least partially surrounds the inner member 20. The outer member 10 includes a receiving surface 12 that has a liner system 30 adhered thereto. The liner system includes a wear resistant matrix that has one or more reinforcing fiber systems 32 and one or more lubricative fiber systems 34 dispersed in the wear resistant matrix. The liner system 30 has a wear resistant surface 35 that includes both portions of the reinforcing fiber system 32 and portions of the lubricative fiber system 34. As shown in FIG. 6, some of the reinforcing fiber system 32 and the lubricative fiber system 34 are exposed to or are coexistent with the wear resistant surface 35 and contact the bearing surface 22. The method includes work hardening the bearing surface to at least a 50 Rockwell C scale hardness. In some embodiments the work hardening one or more of tumbling, hard turning, shot peening, burnishing, in-situ dithering and vibratory finishing. In some embodiments the bearing surface is work hardened to a 50 to 58 Rockwell C scale hardness.

Figure 7:
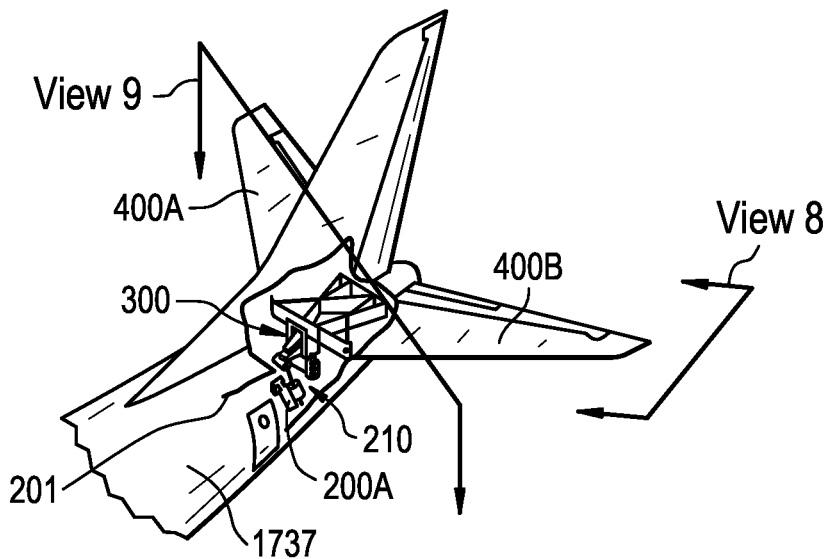
FIG. 7 is perspective view of a horizontal stabilizer system for fixed wing aircraft.
Figure 8:
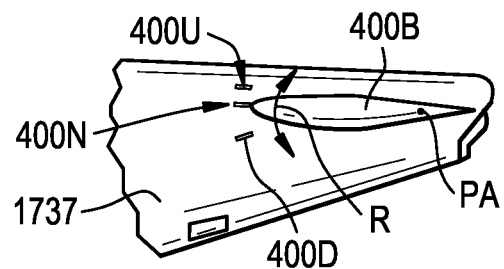
FIG. 8 is a side view of the horizontal stabilizer of FIG. 7 taken in the direction of view 8.
Figure 9:
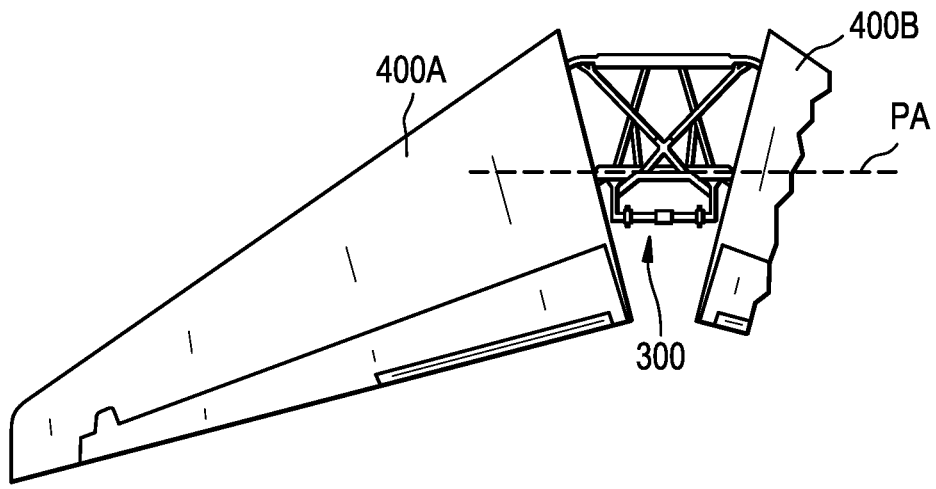
FIG. 9 is a top view of the horizontal stabilizer of FIG. 7 taken in the direction of view 9.
Figure 10A:
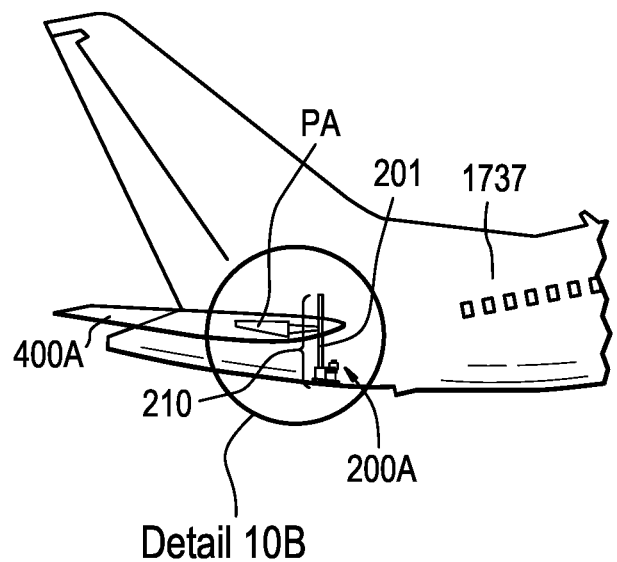
FIG. 10A is a side schematic view of an actuation system for the horizontal stabilizer of FIG. 7.
Figure 10B:
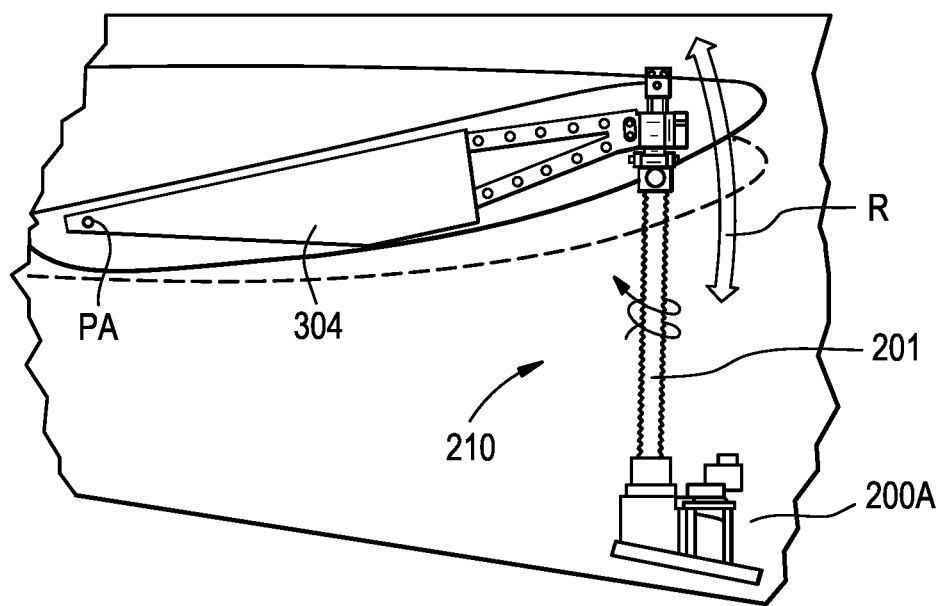
FIG. 10B is an enlarged view of detail 10B of FIG. 10B.
Figure 10C:
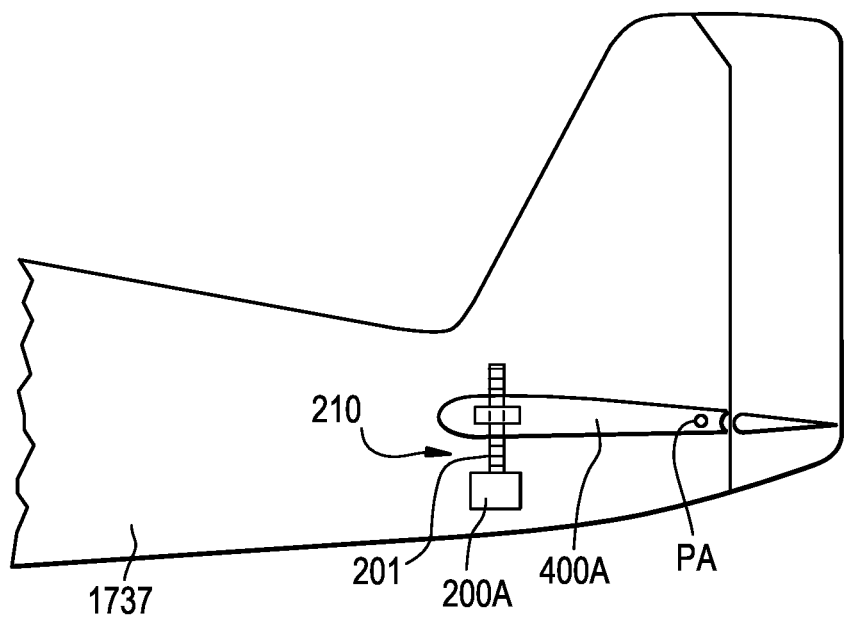
FIG. 10C is side view of the horizontal stabilizer of FIG. 10A.

In some embodiments, the wear resistant bearing 100, 200 is used in connection with an aircraft component. For example, FIGS. 7-11 shows an actuation system 210 for an aircraft component and a flight control surface of an aircraft 1737 (e.g., a Boeing® 737® aircraft, Boeing® 737® are registered trademarks of T737 the Boeing Company). The Boeing® 737® has 126 to 220 seats, a length of 33.6 to 42.1 meters, a wingspan of 35.8 meters, and height of 12.5 meters and has CFM-56 engines. Referring to FIGS. 7-9, the actuation system 210 can include an actuator 200A (e.g., a screw jack actuator) fixed to the aircraft and having an actuator arm 201 movably extending from the actuator 200A. The actuator arm 201 can be connected to a connection end 304Y of a housing 304. The pivot assembly 300 is used to move horizontal stabilizers 400A, 400B through an arcuate range of motion R to and from positions shown on FIG. 8 (i.e., leading edge up marker 400U, neutral position marker 400N, and leading edge down marker 400D). The horizontal stabilizers 400A, 400B are pivotally connected to the aircraft about a pivot axis PA. The connection end of the housing 304 can be threadably connected to the actuator arm 201, although other connection types can also be used.

Figure 14:
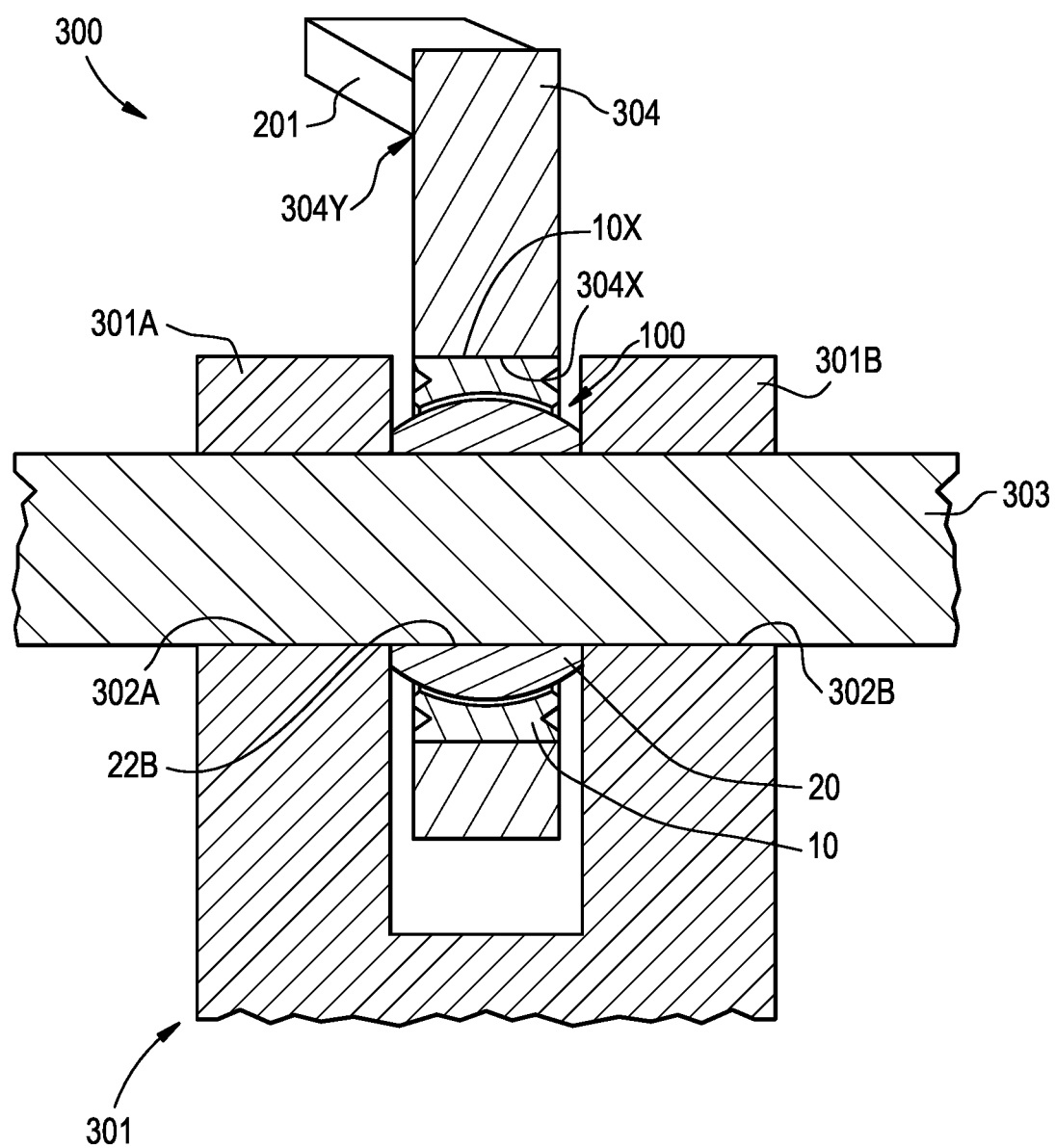
FIG. 14 is a cross sectional view of the bearing of FIG. 1 installed in a clevis.

Referring to FIG. 14, the actuator pivot assembly 300 can include an actuator clevis 301 having a first leg 301A and a second leg 301B. The actuator pivot assembly is employed in an actuator attachment, a pivot point, a structural mounting point or a linkage connection. A first hole 302A extends through the first leg 301A and a second hole 302B extends through the second leg 301B. An actuator pin 303 extends through and is secured in the first hole 302A and the second hole 302B. The actuator pin 303 can define the pivot axis PA and can remain stationary relative to the inner member 20 and the clevis 301. The housing 304 has the connection end 304Y, and the actuator arm 201 is secured to the connection end 304Y. A housing bore 304X extends through the housing 304. A first wear resistant bearing 100 can be connected in the housing bore 304X of the housing 304. The wear resistant bearing can include a mounting bore 22B extending through the inner member 20 and the outer member has a radially outermost exterior surface 10X. The radially outermost exterior surface 10X is seated in the housing bore 304B. A central portion of the actuator pin 303 is seated in the mounting bore 22B of the inner member 20.

Figure 11A:
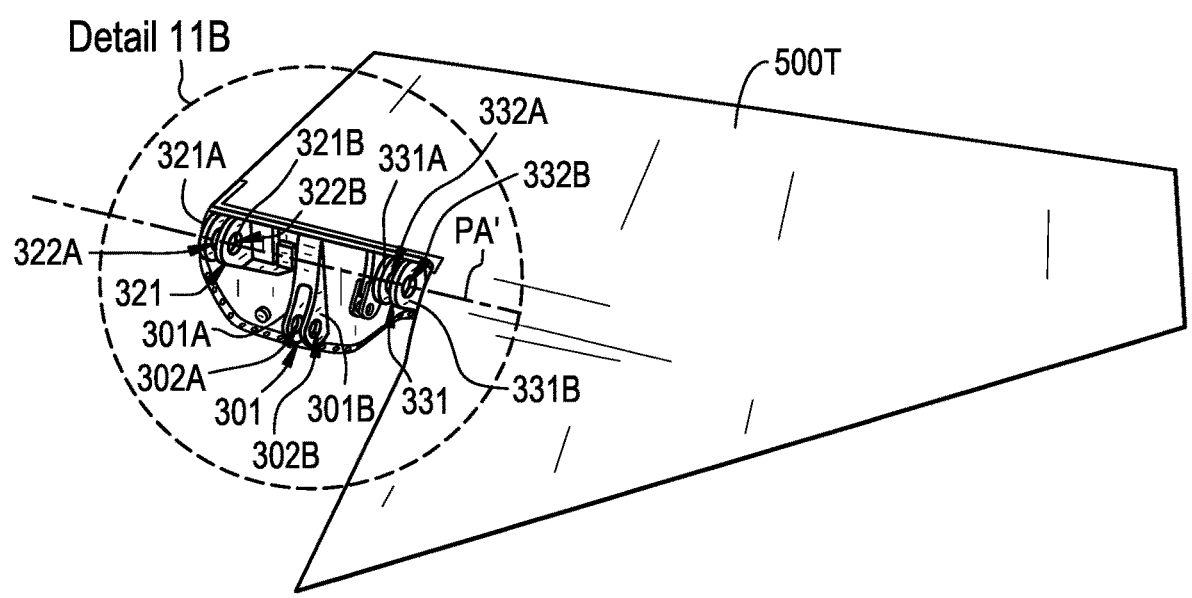
FIG. 11A is a perspective view of a horizontal tail for an F-35 aircraft shown removed from the aircraft.
Figure 11B:
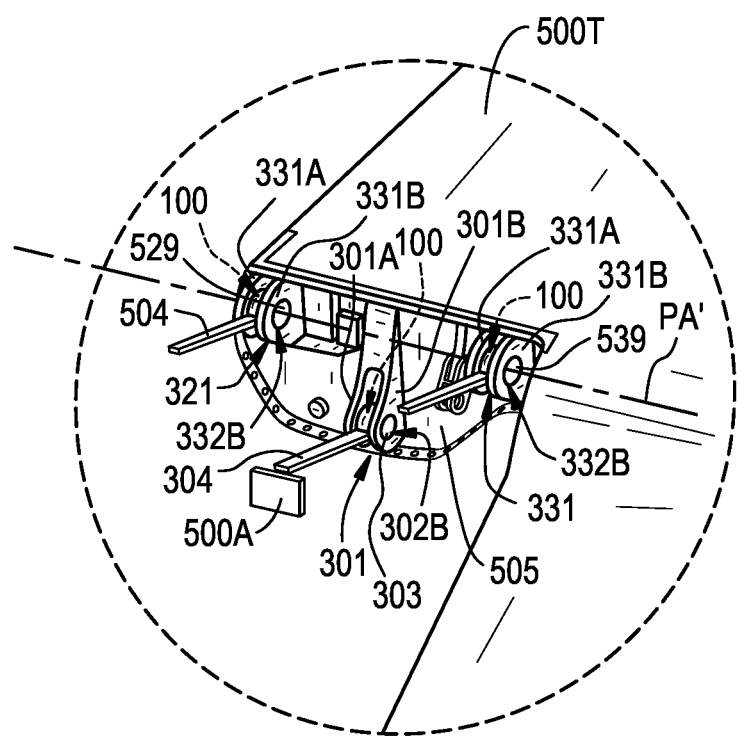
FIG. 11B is an enlarged view of the bearing assembly area of FIG. 11A.
Figure 12:
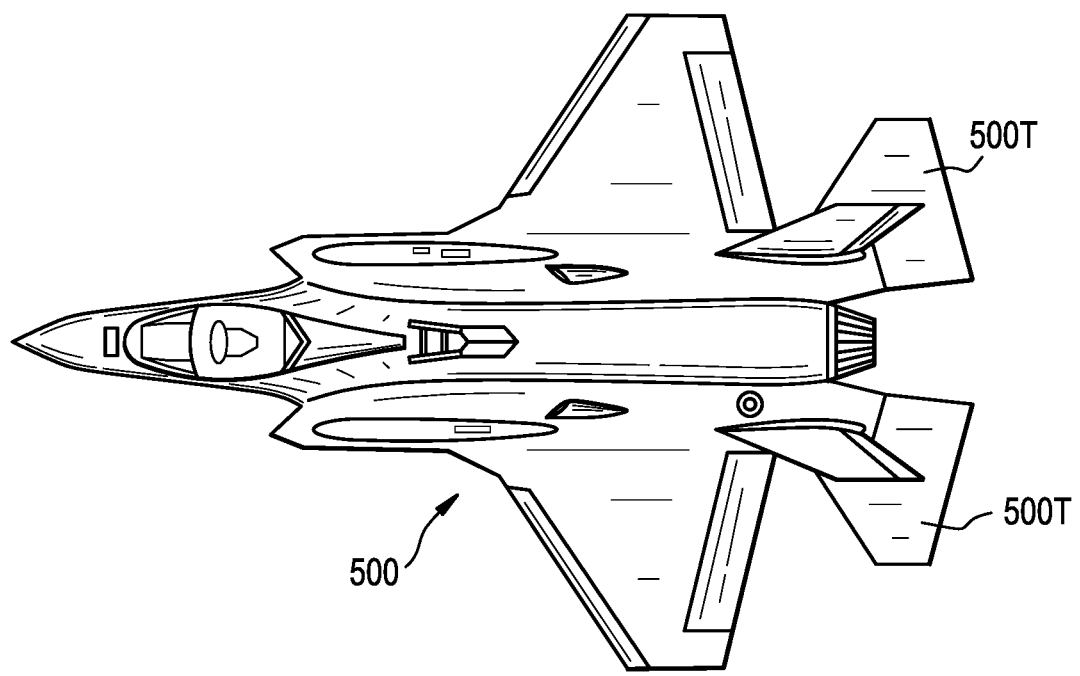
FIG. 12 is a top view of the F-35 aircraft showing the horizontal tail.

FIGS. 11A, 11B, and 12 show an embodiment where the wear resistant bearing 100 is used in connection with a horizontal tail 500T of an aircraft 500 (e.g., and F-35 aircraft). The F-35 aircraft is Lockheed Martin® (Lockheed Martin is a registered trademark of Lockheed Martin Corporation) single-seat, single-engine, all-weather stealth multirole combat aircraft that is intended to perform both air superiority and strike missions. The F-35 has a length of 15.7 meters, a wingspan of 11 meters, a height of 4.4 meters and has Pratt & Whitney® (Pratt & Whitney is a registered trademark of Raytheon Technologies Corporation) F135-PW-100 afterburning turbofan engines. The horizontal tail 500T is pivotally connected to the aircraft 500 about a pivot axis PA' and is moved via an actuator 500A (e.g., a linear actuator). The first radially outermost exterior surface 10X of the bearing 100 is seated in a housing bore 304B and a central portion of the actuator pin 303 is seated in the first mounting bore 22B.

An inboard clevis 321 is secured to the horizontal tail 500T and has a third leg 321A and a fourth leg 321B. A third hole 322A extends through the third leg 321A and a fourth hole 322B extends through the fourth leg 321B. An inboard pin 529 extends through and is secured in the third hole 322A and the fourth hole 322B. An inboard tab 504 is secured to the aircraft and has an inboard bore extending therethrough. A second wear resistant bearing 100 is seated in the inboard bore and a central portion of the inboard pin 529 is seated in the mounting bore 22B of the second wear resistant bearing 100.

An outboard clevis 331 is secured to the horizontal tail 500T and has a fifth leg 331A and a sixth leg 331B. A fifth hole 332A extends through the fifth leg 331A and a sixth hole 332B extends through the sixth leg 331B. An outboard pin 539 extends through and is secured in the fifth hole 332A and the sixth hole 332B. An outboard tab 505 is secured to the aircraft and has an outboard bore extending therethrough. A third wear resistant bearing 100 is seated in the outboard bore and a central portion of the outboard pin 539 is seated in the mounting bore 22B of the third wear resistant bearing 100.

Figure 13A:
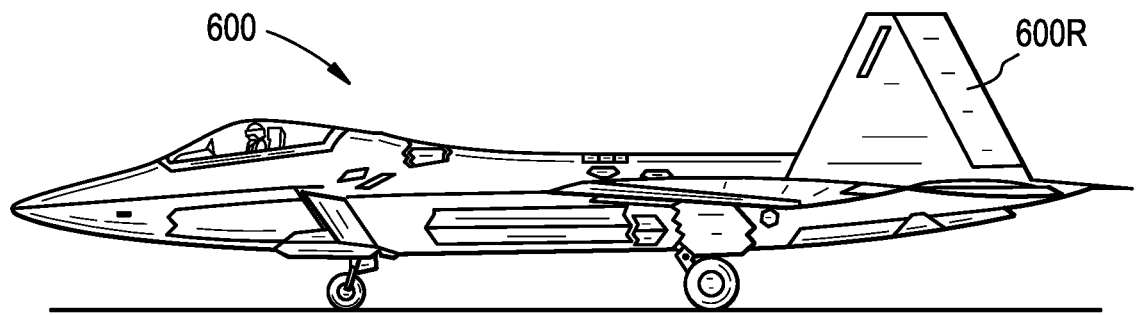
FIG. 13A is a side view of an F-22 aircraft showing the rudder.
Figure 13B:
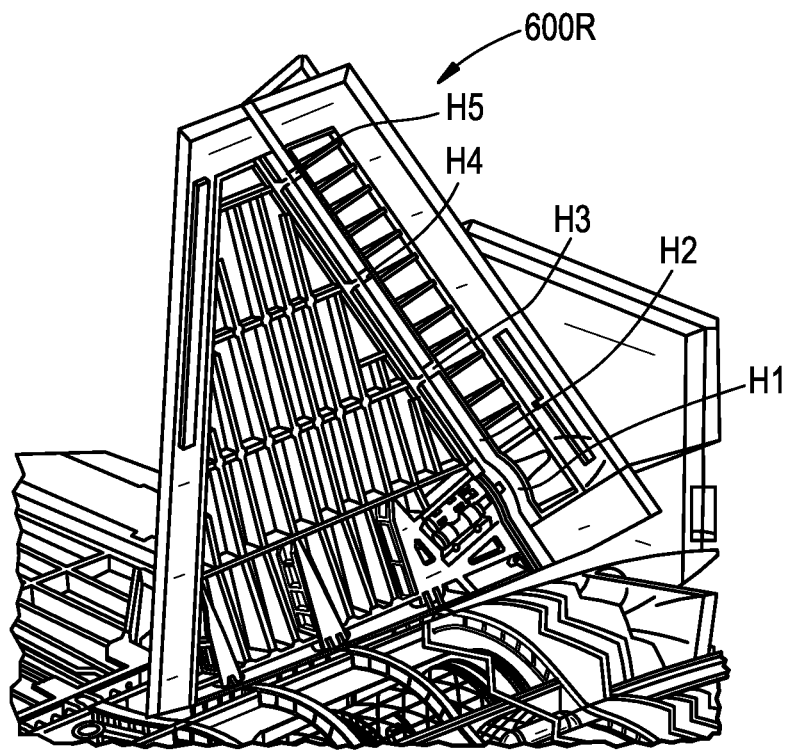
FIG. 13B is an enlarged view of the rudder of FIG. 13A.

FIGS. 13A and 13B show an embodiment where the wear resistant bearing 100 is used in connection with a rudder 600R of an aircraft 600 (e.g., an F-22 aircraft). The F-22 has a length of 18.9 meters, a wingspan of 13.6 meters, a height of 5.1 meters and employs two Pratt & Whitney® F119-PW-100 turbofan engines with afterburners and two-dimensional thrust vectoring nozzles. The wear resistant bearing 100 is disposed in one or more hinge assembly locations H1, H2, H3, H4. H5 to pivotally connect the rudder 600R to the tail section of the aircraft 600. However, the hinge location H1 can employ a rolling element bearing.

The following clauses that are listed as items represent embodiments of the present disclosure.

Item 1. A wear resistant bearing system for dithering applications, the bearing system comprising: a metallic inner member having a bearing surface that is work hardenable and has an initial hardness; and an outer member at least partially surrounding the inner member, the outer member comprising a receiving surface having liner system adhered thereto, the liner system comprising a wear resistant matrix comprising at least one reinforcing fiber system and having at least one polymeric lubricant dispersed in the wear resistant matrix, and the liner system having a wear surface;

wherein the bearing surface is configured such that the initial hardness is increased to a second hardness that is greater than the initial hardness as a result of work hardening caused by in-situ dithering of the inner member relative to the outer member.

Item 2. The wear resistant bearing system of item 1, wherein the initial hardness is less than 50 HRC, and preferably less than 45 HRC and more preferably between 36 HRC and 45 HRC.

Item 3. The wear resistant bearing system of item 1, wherein the second hardness is greater than 50 HRC and preferably about 50 HRC to about 58 HRC.

Item 4. The wear resistant bearing system of item 1, wherein the inner member comprises one of an austenitic stainless steel, a nickel-based super alloy and a titanium alloy.

Item 5. The wear resistant bearing system of item 1, wherein the wear resistant matrix is exposed to the wear resistant surface and ditheringly engages the bearing surface thereby causing the work hardening of the bearing surface.

Item 6. The wear resistant bearing system of item 5, wherein the bearing surface comprises microscopic asperities, and the wear resistant surface ditheringly engages and work hardens the microscopic asperities.

Item 7. The wear resistant bearing system of item 1, wherein the at least one polymeric lubricant remains in the wear resistant matrix.

Item 8. The wear resistant bearing system of item 7, wherein the at least one polymeric lubricant comprises at least one of polytetrafluoroethylene (PTFE), ethylene tetrafluoroethylene (ETFE) and high density polyethylene (HDPE).

Item 9. The wear resistant bearing system of item 1, wherein the at least one reinforcing fiber system comprises at least one of aramid, glass, polyester, and polyphenylene sulfide.

Item 10. The wear resistant bearing system of item 1, wherein the dithering is defined by a bearing stress between the bearing surface and the wear surface of less than 5 ksi, a cyclic frequency of greater than 1 Hz, an angle of oscillation of less than or equal to ±5 degrees and at a temperature of about 18 degrees Celsius (65 degrees Fahrenheit) to about 24 degrees Celsius (75 degrees Fahrenheit).

Item 11. A wear resistant bearing system for dithering applications, the bearing system comprising: a metallic inner member having a bearing surface that is not work hardenable; and an outer member at least partially surrounding the inner member, the outer member comprising a receiving surface having liner system adhered thereto, the liner system comprising a wear resistant matrix comprising a basal layer which is adhered to the receiving surface, the basal layer comprising at least one reinforcing fiber system, the wear resistant matrix having a wear surface layer which has an wear surface that is in sliding engagement with the bearing surface, the wear surface layer extending between the wear surface and the basal layer, the wear surface layer consisting entirely of at least one polymeric lubricant.

Item 12. The wear resistant bearing system of item 11, wherein the wear resistant matrix comprises a semi-crystalline or crystalline film-forming polymer.

Item 13. The wear resistant bearing system of item 12, wherein the semi-crystalline or crystalline film-forming polymer comprise a polyimide or nitrile-phenolic.

Item 14. The wear resistant bearing system of item 11, wherein the wear surface is ablated using glass bead ablation.

Item 15. A wear resistant bearing system for cryogenic applications, the bearing system comprising: a metallic inner member having a bearing surface with an initial hardness; and an outer member at least partially surrounding the inner member, the outer member comprising a receiving surface having liner system adhered thereto, the liner system comprising a wear resistant matrix comprising at least one reinforcing fiber system and having at least one polymeric lubricant dispersed in the wear resistant matrix, and the liner system having a wear surface; wherein metallic inner member is configured such that the initial hardness is increased to a second hardness that is greater than the first hardness as a result of work hardening.

Item 16. The bearing system of item 15, wherein the inner member comprises one of an un-worked austenitic stainless steel, a nickel-based super alloy, and a titanium alloy.

Item 17. The bearing system of item 15, wherein the inner member comprising a plating on the bearing surface.

Item 18. The bearing system of item 17, wherein the plating comprises chromium.

Item 19. The bearing system of item 17, wherein the plating comprises AMS 2438 chromium.

Item 20. The bearing system of item 15, wherein the bearing surface is work hardenable.

Item 21. The bearing system of item 20, wherein bearing surface is work hardenable without substantial necking.

Item 22. The bearing system of item 15, wherein the work hardening is caused by dithering of the inner member relative to the outer member.

Item 23. The bearing system of item 22, wherein the dithering is defined by a frequency of greater than or equal to 0.3 Hz angles of oscillation of about 45 to about 55 degrees at temperature range of about negative 184 degrees Celsius (negative 300 degrees Fahrenheit) to about negative 59 degrees Celsius (negative 75 degrees Fahrenheit) and at a bearing stress of about 5 ksi to about 40 ksi between the bearing surface and the liner system.

Item 24. A wear resistant bearing system comprising: a metallic inner member having a bearing surface; and an outer member at least partially surrounding the inner member, the outer member comprising a receiving surface having liner system adhered thereto, the liner system comprising a wear resistant matrix comprising at least one reinforcing fiber system and having at least one polymeric lubricant dispersed in the wear resistant matrix, and the liner system having a wear surface.

Item 25. The wear resistant bearing system of item 24, wherein the bearing surface has an initial hardness; and wherein the bearing surface of the inner member has a second hardness that is greater than the initial hardness as a result of work hardening caused by in-situ dithering of the inner member relative to the outer member.

Item 26. The wear resistant bearing system of item 24, wherein the bearing surface is work hardenable.

Item 27. The wear resistant bearing system of item 24, wherein the bearing surface is work hardenable in-situ in the outer member.

Item 28. The wear resistant bearing system of item 24, wherein the bearing surface is not work hardenable.

Item 29. The wear resistant bearing system of item 24, wherein the wear resistant matrix comprises a basal layer which is adhered to the receiving surface, the basal layer comprising at least one reinforcing fiber system, the wear resistant matrix having a wear surface layer which has an wear surface that is in sliding engagement with the bearing surface, the wear surface layer extending between the wear surface and the basal layer, the wear surface layer consisting entirely of at least one polymeric lubricant.

Item 30. The wear resistant bearing system of item 24, wherein the bearing surface has an initial hardness, and the bearing surface being work hardenable; and wherein the bearing surface of the inner member is increased to a second hardness that is greater than the first hardness as a result of work hardening.

Item 31. The wear resistant bearing system of item 30, wherein the work hardening is a result of dithering of the inner member relative to the outer member.

Item 32. A wear resistant bearing of any of the preceding items installed in an aircraft or rocket.

Item 33. A method for making a wear resistant bearing, the method comprising: providing a metallic inner member having a bearing surface; and an outer member at least partially surrounding the inner member, the outer member comprising a receiving surface having a liner system adhered thereto, the liner system comprising a wear resistant matrix comprising at least one reinforcing fiber system and having at least one polymeric lubricant dispersed in the wear resistant matrix, and the liner system having a wear surface; and selecting one of a work hardenable austenitic stainless steel, a work hardenable nickel-based super alloy and a work hardenable titanium alloy for the inner member, wherein the wear resistant bearing is configured to be employed in a dithering applications.

Item 34. The method of item 33, wherein the dithering is defined by a bearing stress between the bearing surface and the wear surface of less than 5 ksi, a cyclic frequency of greater than 1 Hz, an angle of oscillation of less than or equal to plus or minus 5 degrees and at a temperature of about 18 degrees Celsius (65 degrees Fahrenheit) to about 24 degrees Celsius (75 degrees Fahrenheit).

Item 35. A method for making a wear resistant bearing, the method comprising: providing a metallic inner member having a bearing surface; and an outer member at least partially surrounding the inner member, the outer member comprising a receiving surface having a liner system adhered thereto, the liner system comprising a wear resistant matrix comprising at least one reinforcing fiber system and having at least one polymeric lubricant dispersed in the wear resistant matrix, and the liner system having a wear surface; selecting a metallic material that is not work hardenable, for the inner member when the wear resistant bearing is employed for a dithering application; and selecting the wear resistant matrix that comprises a basal layer which is adhered to the receiving surface, the basal layer comprising at least one reinforcing fiber system, the wear resistant matrix having a wear surface layer which has an wear surface that is in sliding engagement with the bearing surface, the wear surface layer extending between the wear surface and the basal layer, the wear surface layer consisting entirely of at least one polymeric lubricant when the wear resistant bearing is employed for cryogenic applications.

Item 36. The method of item 35, wherein the dithering is defined by a bearing stress between the bearing surface and the wear surface of about 5 ksi to about 40 ksi, a cyclic frequency of greater than or equal to 0.3 Hz, an angle of oscillation of less than or equal to about 45 degrees to about 55 degrees and the cryogenic application are defined by a temperature of about negative 184 degrees Celsius (negative 300 degrees Fahrenheit) to about negative 59 degrees Celsius (negative 75 degrees Fahrenheit).

Item 37. A method of work hardening a bearing component, the method comprising: providing a metallic inner member having a bearing surface; and an outer member at least partially surrounding the inner member, the outer member comprising a receiving surface having a liner system adhered thereto, the liner system comprising a wear resistant matrix comprising at least one reinforcing fiber system and having at least one polymeric lubricant dispersed in the wear resistant matrix, and the liner system having a wear surface; and work hardening the bearing surface in-situ while the outer member is in dithering relation with the inner member.

Item 38. The method of item 37, wherein the dithering relation is defined by a bearing stress between the bearing surface and the wear surface of less than 5 ksi, a cyclic frequency of greater than 1 Hz, an angle of oscillation of less than or equal to ±5 degrees and at a temperature of about 18 degrees Celsius (65 degrees Fahrenheit) to about 24 degrees Celsius (75 degrees Fahrenheit).

Item 39. The method of item 37, wherein the dithering is defined by a bearing stress between the bearing surface and the wear surface of about 5 ksi to about 40 ksi, a cyclic frequency of greater than or equal to 0.3 Hz, and an angle of oscillation of less than or equal to about 45 degrees to about 55 degrees; and performing the dithering in a cryogenic application defined by a temperature of about negative 184 degrees Celsius (negative 300 degrees Fahrenheit) to about negative 59 degrees Celsius (negative 75 degrees Fahrenheit).

As will be apparent to those skilled in the art, various modifications, adaptations, and variations of the foregoing specific disclosure can be made without departing from the scope of the claims set forth herein. The various features and elements of the disclosure described herein may be combined in a manner different than the specific examples described or claimed herein without departing from the scope of the disclosure. In other words, any element or feature may be combined with any other element or feature in different embodiments, unless there is an obvious or inherent incompatibility between the two, or it is specifically excluded.

References in the specification to "one embodiment," "an embodiment," "some embodiments," etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification.

The singular forms "a," "an," and "the" include plural reference unless the context clearly dictates otherwise. Thus, for example, a reference to "a plant" includes a plurality of such plants. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition, or step being referred to is an optional (not required) feature of the disclosure.

The term "and/or" means any one of the items, any combination of the items, or all of the items with which this term is associated. The phrase "one or more" is readily understood by one of skill in the art, particularly when read in context of its usage.

Each numerical or measured value in this specification is modified by the term "about." The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by the skilled artisan, all numbers, including those expressing quantities of reagents or ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third, and upper third, etc.

As will also be understood by one skilled in the art, all language such as "up to," "at least," "greater than," "less than," "more than," "or more," and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the disclosure encompasses not only the entire group listed as a whole, but each member of the group individually and all possible subgroups of the main group. Additionally, for all purposes, the disclosure encompasses not only the main group, but also the main group absent one or more of the group members. The disclosure therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

What is claimed is:

1. A wear resistant bearing system, the bearing system comprising:
an inner member having an internal core and a bearing surface, the bearing surface having at least a 50 Rockwell C scale hardness and the inner member having a chemical composition that is uniform throughout the internal core and the bearings surface; and
an outer member at least partially surrounding the inner member, the outer member comprising a receiving surface having liner system adhered thereto, the liner system comprising a wear resistant matrix comprising at least one reinforcing fiber system and having at least one lubricative fibers system dispersed in the wear resistant matrix, and the liner system having a wear surface comprising portions of both the reinforcing fiber system and the at least one lubricative fiber systems and the wear surface being continuous.

2. The wear resistant bearing system of claim 1, wherein the chemical composition of the inner member comprises a nickel-based super alloy.

3. The wear resistant bearing system of claim 2, wherein the chemical composition for the nickel based super alloy comprises 50.0 to 55.0 percent by mass Nickel, 17.0 to 21.0 percent by mass Chromium, 2.8 to 3.3 percent by mass Molybdenum, total combined percent by mass of Niobium and Tantalum is between 4.75 and 5.5, 0.0 to 1.0 percent by mass Cobalt, 0.0 to 0.35 percent by mass Manganese, 0.0 to 0.3 percent by mass Copper, 0.2 to 0.8 percent by mass Aluminum, 0.65 to 1.15 percent by mass Titanium, 0.0 to 0.35 percent by mass Silicon, 0.0 to 0.08 percent by mass Carbon, 0.0 to 0.015 percent by mass Sulfur, 0.0 to 0.015 percent by mass Phosphorus, and 0.0 to 0.006 percent by mass Boron, and balance Iron.

4. The wear resistant bearing system of claim 1, wherein the chemical composition of the inner member comprises a titanium based alloy.

5. The wear resistant bearing system of claim 4, wherein the chemical composition for the titanium based alloy comprises 5.50 to 6.75 percent by mass Aluminum, 3.50 to 4.50 percent by mass Vanadium, maximum of 0.30 percent by mass Iron, maximum of 0.20 percent by mass Oxygen, maximum of 0.08 percent by mass Carbon, maximum of 0.005 percent by mass Nitrogen (500 ppm), maximum of 0.0125 percent by mass Hydrogen 9125 ppm), maximum of 0.005 percent by mass Yttrium 0.005 (50 ppm), maximum of 0.10 percent by mass of each of other elements, maximum of 0.040 percent by mass, total, for all the other elements, remainder Titanium.

6. The wear resistant bearing system of claim 1, wherein the internal core has a 36 to 46 Rockwell C scale hardness.

7. The wear resistant bearing system of claim 1, wherein the bearing surface has 50 to 58 Rockwell C scale hardness.

8. The wear resistant bearing system of claim 1, wherein the bearing surface has about a 51 Rockwell C scale hardness.

9. The wear resistant bearing system of claim 1, wherein the wear resistant matrix is exposed to the wear resistant surface and ditheringly engages the bearing surface.

10. The wear resistant bearing system of claim 9, wherein the bearing surface comprises microscopic asperities, and the wear resistant surface ditheringly engages the microscopic asperities.

11. The wear resistant bearing system of claim 10, wherein the dithering is defined by a bearing stress between the bearing surface and the wear surface of less than 40 ksi, a cyclic frequency of greater than or equal to 0.3 Hz, a total angle of oscillation of less than or equal to 90 degree and a temperature of less than 450 degrees Fahrenheit, and wherein the total angle of oscillation comprises clockwise and counterclockwise movement.

12. The wear resistant bearing system of claim 1, wherein the inner member comprising a case layer having a case depth of about 0.0030 inches and the case layer having at least a 50 Rockwell C scale hardness.

13. The wear resistant bearing system of claim 1, wherein the inner member comprising a case layer having a case depth of about 0.0030 inches and the case layer having at least a 48 Rockwell C scale hardness.

14. The wear resistant bearing system of claim 1, wherein the inner member comprising a case layer having a case depth from about 0.0001 to about 0.0002 inches and the case layer having at least a 48 Rockwell C scale hardness.

15. The wear resistant bearing system of claim 1, wherein the at least one lubricative fiber systems comprises at least one of polytetrafluoroethylene (PTFE), ethylene tetrafluoroethylene (ETFE) and high density polyethylene (HDPE).

16. The wear resistant bearing system of claim 1, wherein the at least one reinforcing fiber system comprises at least one of aramid, glass, polyester, polyamide, polyimide and polyphenylene sulfide.

17. The wear resistant bearing system of claim 1, wherein the at least one reinforcing fiber system comprises a woven fabric.

18. The wear resistant bearing system of claim 1, wherein the bearings surface is substantially continuous and has a surface finish of less than 16 Ra.

19. The wear resistant bearing of claim 1 installed in an aircraft or rocket.

20. The wear resistant bearing of claim 19, wherein the aircraft is at least one of a Boeing 737 aircraft, an F-22 aircraft and an F-35 aircraft.

21. The wear resistant bearing of claim 1 installed in a fixed wing aircraft component, a rotary wing aircraft components or an actuation systems for a flight control surface of a fixed wing aircraft.

22. The wear resistant bearing of claim 21, wherein the flight control surface comprises at least one of rudders, horizontal stabilizers, elevators, flaps, ailerons, elevons, spoilers, speed brakes and slats.

23. The wear resistant bearing of claim 21, wherein the fixed wing aircraft component comprises at least one of thrust reversers, blocker doors, engine mounts, landing gear trunnions, landing gear up-lock latches, landing gear doors, control rods, auxiliary power unit mounts, intake and exhaust port valves for fuel cells.

24. The wear resistant bearing of claim 21, wherein the rotary wing aircraft flight components control surfaces comprise at least one control rods, pitch links, lead lag link, lead lag damper, swash plate, tail rotor links, engine mounts, auxiliary power unit mounts, and landing gear components.

25. An actuation system for an aircraft component and a flight control surface of an aircraft, the actuation system comprising:
an actuator fixed to the aircraft and having an actuator arm movably extending from the actuator;
an actuator pivot assembly comprising an actuator clevis having a first leg and a second leg, a first hole extending through the first leg and a second hole extending through the second leg, an actuator pin extending through and secured in the first hole and the second hole, a housing having a connection end with the actuator arm secured thereto, a housing bore extending through the housing;
the wear resistant bearing system according to claim 1 and further comprising a mounting bore extending through the inner member and the outer member having a radially outermost exterior surface;
the radially outermost exterior surface being seated in the housing bore;
a central portion of the actuator pin being seated in the mounting bore of the inner member.

26. The actuation system of claim 25, wherein the chemical composition of the inner member comprises a nickel-based super alloy.

27. The actuation system of claim 25, wherein the chemical composition of the inner member comprises a titanium based alloy.

28. The actuation system of claim 25, wherein the bearing surface has 50 to 58 Rockwell C scale hardness.

29. The actuation system of claim 25, wherein the bearing surface has about a 51 Rockwell C scale hardness.

30. The actuation system of claim 25 installed in a horizontal stabilizer of the aircraft, the horizontal stabilizer being pivotally connected to the aircraft about a pivot axis defined by the actuator pin and the actuator arm being connected to the horizontal stabilizer at a distance away from the pivot axis.

31. The actuation system of claim 25 installed in a horizontal tail of the aircraft, the horizontal tail being pivotally connected to the aircraft about a pivot axis;
a first wear resistant bearing system according to the wear resistant bearing system of claim 1 further comprising a first mounting bore extending through a first of the inner member and a first of the outer member having a first radially outermost exterior surface;
the first radially outermost exterior surface being seated in the housing bore; and
a central portion of the actuator pin being seated in the first mounting bore.

32. The actuation system of claim 31, further comprising:
an inboard clevis secured to the horizontal tail and having a third leg and a fourth leg, a third hole extending through the third leg and a fourth hole extending through the fourth leg, and an inboard pin extending through and secured in the third hole and the fourth hole, an inboard tab secured to the aircraft and having an inboard bore extending therethrough;
a second wear resistant bearing system according to the wear resistant bearing system of claim 1 further comprising a second mounting bore extending through a second of the inner member and a second of the outer member having a second radially outermost exterior surface;
the second radially outermost exterior surface being seated in the inboard bore; and
a central portion of the inboard pin being seated in the second mounting bore.

33. The actuation system of claim 32, further comprising:
an outboard clevis secured to the horizontal tail and having a fifth leg and a sixth leg, a fifth hole extending through the fifth leg and a sixth hole extending through the sixth leg and an outboard pin extending through and secured in the fifth hole and the sixth hole, an outboard tab secured to the aircraft and having an outboard bore extending therethrough;
a third wear resistant bearing system according to the wear resistant bearing system of claim 1 further comprising a third mounting bore extending through a third of the inner member and a third of the outer member having a third radially outermost exterior surface;
the third radially outermost exterior surface being seated in the outboard bore;
a central portion of the outboard pin being seated in the third mounting bore of the inner member.

34. An actuation system for an aircraft, the actuation system comprising:
an actuator fixed to the aircraft and having an actuator arm movably extending from the actuator;

an actuator pivot assembly comprising an actuator clevis having a first leg and a second leg, a first hole extending through the first leg and a second hole extending through the second leg, an actuator pin extending through and secured in the first hole and the second hole, a housing having a connection end with the actuator arm secured thereto, a housing bore extending through the housing;

a plurality of the wear resistant bearing systems according to claim 1 and each further comprising a mounting bore extending through the inner member and the outer member having a radially outermost exterior surface;

the radially outermost exterior surface being seated in the housing bore;

a central portion of the actuator pin being seated in the mounting bore of the inner member;

the plurality of wear resistant bearing systems being coaxially mounted between the aircraft and a rudder of the aircraft and the actuator arm engaging the rudder for pivoting the rudder relative to the aircraft.

35. A pivoting mechanism for an aircraft or rocket, the pivoting mechanism comprising:

a clevis mounted to the aircraft or rocket;

the wear resistant bearing system according to claim 1 disposed in the clevis such that the inner member is in fixed relation to the clevis and the outer member is moveable relative to the inner member about a pivot axis.

36. A method of manufacturing wear resistant bearing, the method comprising:

providing an inner member having an internal core and a bearing surface, and the inner member having a chemical composition that is uniform throughout the internal core and the bearings surface, the chemical composition being a nickel-based super alloy or a titanium based alloy;

providing an outer member at least partially surrounding the inner member, the outer member comprising a receiving surface having liner system adhered thereto, the liner system comprising a wear resistant matrix comprising at least one reinforcing fiber system and having at least one lubricative fiber system dispersed in the wear resistant matrix, and the liner system having a wear surface comprising both the reinforcing fiber system and the at least one lubricative fiber system;

work hardening the bearing surface to at least a 50 Rockwell C scale hardness.

37. The method of claim 36, wherein the work hardening is at least one of tumbling, hard turning, shot peening, burnishing, in-situ dithering and vibratory finishing.

38. The method of claim 36, comprising work hardening the bearing surface to a 50 to 58 Rockwell C scale hardness.

* * * * *